United States Patent
Ohta et al.

(10) Patent No.: US 12,439,455 B2
(45) Date of Patent: Oct. 7, 2025

(54) RADIO STATION AND COMMUNICATION SYSTEM

(71) Applicant: FUJITSU LIMITED, Kawasaki (JP)

(72) Inventors: Yoshiaki Ohta, Yokohama (JP);
Yoshihiro Kawasaki, Kawasaki (JP);
Tetsuya Yano, Yokohama (JP);
Ryosuke Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 335 days.

(21) Appl. No.: 17/992,356

(22) Filed: Nov. 22, 2022

(65) Prior Publication Data

US 2023/0082591 A1    Mar. 16, 2023

Related U.S. Application Data

(63) Continuation of application No. PCT/JP2020/021547, filed on Jun. 1, 2020.

(51) Int. Cl.
*H04W 74/0816* (2024.01)
*H04W 74/08* (2009.01)

(52) U.S. Cl.
CPC ... *H04W 74/0816* (2013.01); *H04W 74/0866* (2013.01)

(58) Field of Classification Search
CPC .......................... H04W 74/0866; H04L 12/28
USPC .......................................... 370/329, 400, 403
See application file for complete search history.

(56) References Cited

U.S. PATENT DOCUMENTS

| | | | |
|---|---|---|---|
| 2015/0117342 A1 | 4/2015 | Loehr et al. | |
| 2016/0049997 A1 | 2/2016 | Onodera et al. | |
| 2017/0295590 A1 * | 10/2017 | Loehr | H04W 72/56 |
| 2019/0098644 A1 | 3/2019 | Loehr et al. | |
| 2019/0223190 A1 | 7/2019 | Hwang et al. | |
| 2019/0239239 A1 | 8/2019 | Hwang et al. | |
| 2020/0281000 A1 | 9/2020 | Loehr et al. | |
| 2020/0374899 A1 | 11/2020 | Ohta | |

(Continued)

FOREIGN PATENT DOCUMENTS

| CN | 108540997 A | 9/2018 |
|---|---|---|
| JP | 2016-119496 A | 6/2016 |

(Continued)

OTHER PUBLICATIONS

3GPP TS 36.211 V16.0.0, 3rd Generation Partnership Project; Technical Specification Group Radio Access Network; Evolved Universal Terrestrial Radio Access (E-UTRA); Physical channels and modulation (Release 16), Dec. 2019.

(Continued)

*Primary Examiner* — Dang T Ton
(74) *Attorney, Agent, or Firm* — Myers Wolin, LLC

(57) ABSTRACT

A radio station includes, a controller configured to configure a bundled channel which is a channel group obtained by bundling a plurality of channels and first information related to the bundled channel, and perform control to generate a transmission opportunity for a second signal that requests an uplink resource for a first signal, according to an amount of data in the bundled channel and the first information, and a communicator configured to transmit the second signal to another radio station according to the transmission opportunity for the second signal, and receives a radio resource from the other radio station.

15 Claims, 14 Drawing Sheets

(56) References Cited

U.S. PATENT DOCUMENTS

| | | | |
|---|---|---|---|
| 2021/0045133 | A1 | 2/2021 | Hwang et al. |
| 2022/0070880 | A1 | 3/2022 | Loehr et al. |
| 2023/0300887 | A1* | 9/2023 | Kurita ............... H04W 16/14 370/329 |

FOREIGN PATENT DOCUMENTS

| | | |
|---|---|---|
| JP | 2018-142980 A | 9/2018 |
| JP | 2019-180098 A | 10/2019 |
| JP | 2020-501441 A | 1/2020 |
| WO | 2019/159272 A1 | 8/2019 |

OTHER PUBLICATIONS

3GPP TS 36.212 V16.0.0, 3rd Generation Partnership Project; Technical Specification Group Radio Access Network; Evolved Universal Terrestrial Radio Access (E-UTRA); Multiplexing and channel coding (Release 16), Dec. 2019.

3GPP TS 36.213 V16.0.0, 3rd Generation Partnership Project; Technical Specification Group Radio Access Network; Evolved Universal Terrestrial Radio Access (E-UTRA); Physical layer procedures (Release 16), Dec. 2019.

3GPP TS 36.300 V16.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019.

3GPP TS 36.321 V15.8.0, 3rd Generation Partnership Project; Technical Specification Group Radio Access Network; Evolved Universal Terrestrial Radio Access (E-UTRA); Medium Access Control (MAC) protocol specification (Release 15), Dec. 2019.

3GPP TS 36.322 V15.3.0, 3rd Generation Partnership Project; Technical Specification Group Radio Access Network; Evolved Universal Terrestrial Radio Access (E-UTRA); Radio Link Control (RLC) protocol specification (Release 15), Sep. 2019.

3GPP TS 36.323 V15.5.0, 3rd Generation Partnership Project; Technical Specification Group Radio Access Network; Evolved Universal Terrestrial Radio Access (E-UTRA); Packet Data Convergence Protocol (PDCP) specification (Release 15), Dec. 2019.

3GPP TS 36.331 V15.8.0, 3rd Generation Partnership Project; Technical Specification Group Radio Access Network; Evolved Universal Terrestrial Radio Access (E-UTRA); Radio Resource Control (RRC); Protocol specification (Release 15), Dec. 2019.

3GPP TS 36.413 V16.0.0, 3rd Generation Partnership Project; Technical Specification Group Radio Access Network; Evolved Universal Terrestrial Radio Access Network (E-UTRAN); S1 Application Protocol (S1AP) (Release 16), Dec. 2019.

3GPP TS 36.423 V16.0.0, 3rd Generation Partnership Project; Technical Specification Group Radio Access Network; Evolved Universal Terrestrial Radio Access Network (E-UTRAN); X2 application protocol (X2AP) (Release 16), Dec. 2019.

3GPP TS 36.425 V15.0.0, 3rd Generation Partnership Project; Technical Specification Group Radio Access Network; Evolved Universal Terrestrial Radio Access Network (E-UTRAN); X2 interface user plane protocol (Release 15), Jun. 2018.

3GPP TS 37.340 V16.0.0, 3rd Generation Partnership Project; Technical Specification Group Radio Access Network; Evolved Universal Terrestrial Radio Access (E-UTRA) and NR; Multi-connectivity; Stage 2 (Release 16), Dec. 2019.

3GPP TS 38.201 V16.0.0, 3rd Generation Partnership Project; Technical Specification Group Radio Access Network; NR; Physical layer; General description (Release 16), Dec. 2019.

3GPP TS 38.202 V16.0.0, 3rd Generation Partnership Project; Technical Specification Group Radio Access Network; NR; Services provided by the physical layer (Release 16), Dec. 2019.

3GPP TS 38.211 V16.0.0, 3rd Generation Partnership Project; Technical Specification Group Radio Access Network; NR; Physical channels and modulation (Release 16), Dec. 2019.

3GPP TS 38.212 V16.0.0, 3rd Generation Partnership Project; Technical Specification Group Radio Access Network; NR; Multiplexing and channel coding (Release 16), Dec. 2019.

3GPP TS 38.213 V16.0.0, 3rd Generation Partnership Project; Technical Specification Group Radio Access Network; NR; Physical layer procedures for control (Release 16), Dec. 2019.

3GPP TS 38.214 V16.0.0, 3rd Generation Partnership Project; Technical Specification Group Radio Access Network; NR; Physical layer procedures for data (Release 16), Dec. 2019.

3GPP TS 38.215 V16.0.1, 3rd Generation Partnership Project; Technical Specification Group Radio Access Network; NR; Physical layer measurements (Release 16), Jan. 2020.

3GPP TS 38.300 V16.0.0, 3rd Generation Partnership Project; Technical Specification Group Radio Access Network; NR; NR and NG-RAN Overall Description; Stage 2 (Release 16), Dec. 2019.

3GPP TS 38.321 V15.8.0, 3rd Generation Partnership Project; Technical Specification Group Radio Access Network; NR; Medium Access Control (MAC) protocol specification (Release 15), Dec. 2019.

3GPP TS 38.322 V15.5.0, 3rd Generation Partnership Project; Technical Specification Group Radio Access Network; NR; Radio Link Control (RLC) protocol specification (Release 15), Mar. 2019.

3GPP TS 38.323 V15.6.0, 3rd Generation Partnership Project; Technical Specification Group Radio Access Network; NR; Packet Data Convergence Protocol (PDCP) specification (Release 15), Jun. 2019.

3GPP TS 38.331 V15.8.0, "3rd Generation Partnership Project; Technical Specification Group Radio Access Network; NR; Radio Resource Control (RRC) protocol specification (Release 15)", Dec. 2019.

3GPP TS 38.340 V0.1.1, "3rd Generation Partnership Project; Technical Specification Group Radio Access Network; NR; Backhaul Adaptation Protocol (BAP) specification (Release 16)", Nov. 2019.

3GPP TS 38.401 V16.0.0, 3rd Generation Partnership Project; Technical Specification Group Radio Access Network; NG-RAN; Architecture description (Release 16), Dec. 2019.

3GPP TS 38.410 V16.0.0, 3rd Generation Partnership Project; Technical Specification Group Radio Access Network; NG-RAN; NG general aspects and principles (Release 16), Dec. 2019.

3GPP TS 38.413 V16.0.0, 3rd Generation Partnership Project; Technical Specification Group Radio Access Network; NG-RAN; NG Application Protocol (NGAP) (Release 16), Dec. 2019.

3GPP TS 38.420 V15.2.0, 3rd Generation Partnership Project; Technical Specification Group Radio Access Network; NG-RAN; Xn general aspects and principles (Release 15) Dec. 2018.

3GPP TS 38.423 V16.0.0, 3rd Generation Partnership Project; Technical Specification Group Radio Access Network; NG-RAN; Xn application protocol (XnAP) (Release 16), Dec. 2019.

3GPP TS 38.470 V16.0.0, 3rd Generation Partnership Project; Technical Specification Group Radio Access Network; NG-RAN; F1 general aspects and principles (Release 16), Dec. 2019.

3GPP TS 38.473 V16.0.0, 3rd Generation Partnership Project; Technical Specification Group Radio Access Network; NG-RAN; F1 application protocol (F1AP) (Release 16), Dec. 2019.

3GPP TR 38.801 V14.0.0, 3rd Generation Partnership Project; Technical Specification Group Radio Access Network; Study on new radio access technology: Radio access architecture and interfaces (Release 14) Mar. 2017.

3GPP TR 38.802 V14.2.0, 3rd Generation Partnership Project; Technical Specification Group Radio Access Network; Study on New Radio Access Technology Physical Layer Aspects (Release 14) Sep. 2017.

3GPP TR 38.803 V14.2.0, 3rd Generation Partnership Project; Technical Specification Group Radio Access Network; Study on new radio access technology: Radio Frequency (RF) and co-existence aspects (Release 14), Sep. 2017.

3GPP TR 38.804 V14.0.0, 3rd Generation Partnership Project; Technical Specification Group Radio Access Network; Study on New Radio Access Technology; Radio Interface Protocol Aspects (Release 14), Mar. 2017.

(56) References Cited

OTHER PUBLICATIONS

3GPP TR 38.900 V15.0.0, 3rd Generation Partnership Project; Technical Specification Group Radio Access Network; Study on channel model for frequency spectrum above 6 GHZ (Release 15) Jun. 2018.

3GPP TR 38.912 V15.0.0, 3rd Generation Partnership Project; Technical Specification Group Radio Access Network; Study on New Radio (NR) access technology (Release 15), Jun. 2018.

3GPP TR 38.913 V15.0.0, 3rd Generation Partnership Project; Technical Specification Group Radio Access Network; Study on Scenarios and Requirements for Next Generation Access Technologies; (Release 15), Jun. 2018.

3GPP TS 37.324 V15.1.0, 3rd Generation Partnership Project; Technical Specification Group Radio Access Network; E-UTRA and NR; Service Data Adaptation Protocol (SDAP) specification (Release 15), Sep. 2018.

International Search Report and Written Opinion of the International Searching Authority issued by the Japan Patent Office for corresponding International Patent Application No. PCT/JP2020/021547, mailed on Aug. 25, 2020, with an English translation.

Notice of Reasons for Refusal issued by the Japan Patent Office for corresponding Japanese Patent Application No. 2022-529129, mailed on Oct. 17, 2023, with an English translation.

First Notification of Office Action issued by the China National Intellectual Property Administration for corresponding Chinese Patent Application No. 202080101521.X, dated Nov. 29, 2024, with an English translation.

Notice of Reasons for Refusal issued by the Japan Patent Office for corresponding Japanese Patent Application No. 2022-529129, dated Jan. 9, 2024, with an English translation.

Second Notification of Office Action issued by the China National Intellectual Property Administration for corresponding Chinese Patent Application No. 202080101521.X, dated Jun. 26, 2025, with an English translation.

* cited by examiner

RADIO STATION AND COMMUNICATION SYSTEM

CROSS-REFERENCE TO RELATED APPLICATION

This application is a continuation application of International Application Number PCT/JP2020/021547 filed on Jun. 1, 2020 and designated the U.S., the entire contents of which are incorporated herein by reference.

FIELD

The present disclosure relates to a radio station and a communication system.

BACKGROUND

In current networks, traffic of mobile terminals (smartphones and future phones) accounts for most of network resources. In addition, there is a trend that traffic used by the mobile terminals continuously increases.

Meanwhile, with the development of IoT (Internet of things) services (for instance, transportation systems, smart meters, or monitoring systems for devices or the like), there is a demand for coping with services that have various requirement. Therefore, in the communication standard for the fifth-generation mobile communication (5G or NR (New Radio)), technologies that implement a higher data rate, a greater capacity, and a lower delay are needed in addition to the 4G (the fourth-generation mobile communication) standard technologies (e.g., Non-Patent Literature 1 to 11).

Note that the 3GPP (Third Generation Partnership Project) working groups (such as, e.g., TSG-RAN WG1 and TSG-RAN WG2) are now studying technologies for the fifth-generation communication standard (Non-Patent Literature 12 to 40).

As described above, to support a wide variety of services, it has been assumed, in 5G, to cope with a great number of use cases that are categorized into eMBB (Enhanced Mobile Broad Band), Massive MTC (Machine Type Communications), and URLLC (Ultra-Reliable and Low Latency Communication).

When performing communication, a terminal device such as a mobile terminal requests a base station device to allocate a radio resource. In response to the request from the terminal device, the base station device allocates the radio resource thereto and notifies the terminal device. Then, the terminal device uses the allocated radio resource to transmit data to the base station device.

Note that this applies not only to the communication between the terminal device and the base station device, but also applies in a same way to V2X. In this case, communication is performed between the terminal device and another terminal device.

Hereinbelow, for the sake of convenience, a description will be given of the communication between the terminal device and the base station device, but devices that perform communication therebetween are not limited thereto. For instance, an application is able to be made also to the communication between the terminal devices, such as the V2X. In this case, for instance, the "base station device" is replaced with the "other terminal device".

Technologies related to the 5G are described in the following citation list.

CITATION LIST

Non-Patent Literature

NPL1: 3GPP TS 36.211 V16.0.0 (2019 December)
NPL2: 3GPP TS 36.212 V16.0.0 (2019 December)
NPL3: 3GPP TS 36.213 V16.0.0 (2019 December)
NPL4: 3GPP TS 36.300 V16.0.0 (2019 December)
NPL5: 3GPP TS 36.321 V15.8.0 (2019 December)
NPL6: 3GPP TS 36.322 V15.3.0 (2019 September)
NPL7: 3GPP TS 36.323 V15.5.0 (2019 December)
NPL8: 3GPP TS 36.331 V15.8.0 (2019 December)
NPL9: 3GPP TS 36.413 V16.0.0 (2019 December)
NPL10: 3GPP TS 36.423 V16.0.0 (2019 December)
NPL11: 3GPP TS 36.425 V15.0.0 (2018 June)
NPL12: 3GPP TS 37.340 V16.0.0 (2019 December)
NPL13: 3GPP TS 38.201 V16.0.0 (2019 December)
NPL14: 3GPP TS 38.202 V16.0.0 (2019 December)
NPL15: 3GPP TS 38.211 V16.0.0 (2019 December)
NPL16: 3GPP TS 38.212 V16.0.0 (2019 December)
NPL17: 3GPP TS 38.213 V16.0.0 (2019 December)
NPL18: 3GPP TS 38.214 V16.0.0 (2019 December)
NPL19: 3GPP TS 38.215 V16.0.1 (2020 January)
NPL20: 3GPP TS 38.300 V16.0.0 (2019 December)
NPL21: 3GPP TS 38.321 V15.8.0 (2019 December)
NPL22: 3GPP TS 38.322 V15.5.0 (2019 March)
NPL23: 3GPP TS 38.323 V15.6.0 (2019 June)
NPL24: 3GPP TS 38.331 V15.8.0 (2019 December)
NPL25: 3GPP TS 38.340 V0.1.1 (2019 November)
NPL26: 3GPP TS 38.401 V16.0.0 (2019 December)
NPL27: 3GPP TS 38.410 V16.0.0 (2019 December)
NPL28: 3GPP TS 38.413 V16.0.0 (2019 December)
NPL29: 3GPP TS 38.420 V15.2.0 (2018 December)
NPL30: 3GPP TS 38.423 V16.0.0 (2019 December)
NPL31: 3GPP TS 38.470 V16.0.0 (2019 December)
NPL32: 3GPP TS 38.473 V16.0.0 (2019 December)
NPL33: 3GPP TR 38.801 V14.0.0 (2017 March)
NPL34: 3GPP TR 38.802 V14.2.0 (2017 September)
NPL35: 3GPP TR 38.803 V14.2.0 (2017 September)
NPL36: 3GPP TR 38.804 V14.0.0 (2017 March)
NPL37: 3GPP TR 38.900 V15.0.0 (2018 June)
NPL38: 3GPP TR 38.912 V15.0.0 (2018 June)
NPL39: 3GPP TR 38.913 V15.0.0 (2018 June)
NPL40: 3GPP TS 37.324 V15.1.0 (2018 September)

Patent Literature

PTL1: Japanese Patent Application Publication No. 2019-180098
PTL2: Japanese Translation of PCT Application No. 2020-501441

However, when opportunities to transmit data are frequently generated, the number of times the terminal device requests allocation of a radio resource and the number of times the radio resource is allocated thereto increase, i.e., signaling increases. The allocation of the radio resource causes transmission/reception of messages, and also increases power consumption of the terminal device. In addition, when, e.g., the terminal device is in a power-saving state (sleep state or intermittent reception state) or the like, repetitive cancellation of the power-saving state increases the power consumption of the terminal device.

SUMMARY

A radio station includes, a controller configured to configure a bundled channel which is a channel group obtained by bundling a plurality of channels and first information related to the bundled channel, and perform control to generate a transmission opportunity for a second signal that requests an uplink resource for a first signal, according to an amount of data in the bundled channel and the first information, and a communicator configured to transmit the second signal to another radio station according to the transmission opportunity for the second signal, and receives a radio resource from the other radio station. The above communicator receives a third signal from the other radio station in response to the second signal, and transmits the transmission data in response to the third signal. Note that the same approach is also applicable even in the case of "one channel", not the "plurality of channels". Accordingly, for the sake of convenience, a description will be given hereinbelow of a case where the "plurality of" channels are bundled but, even in the case of the one channel, the meaning is the same.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENTS

Figure 1:
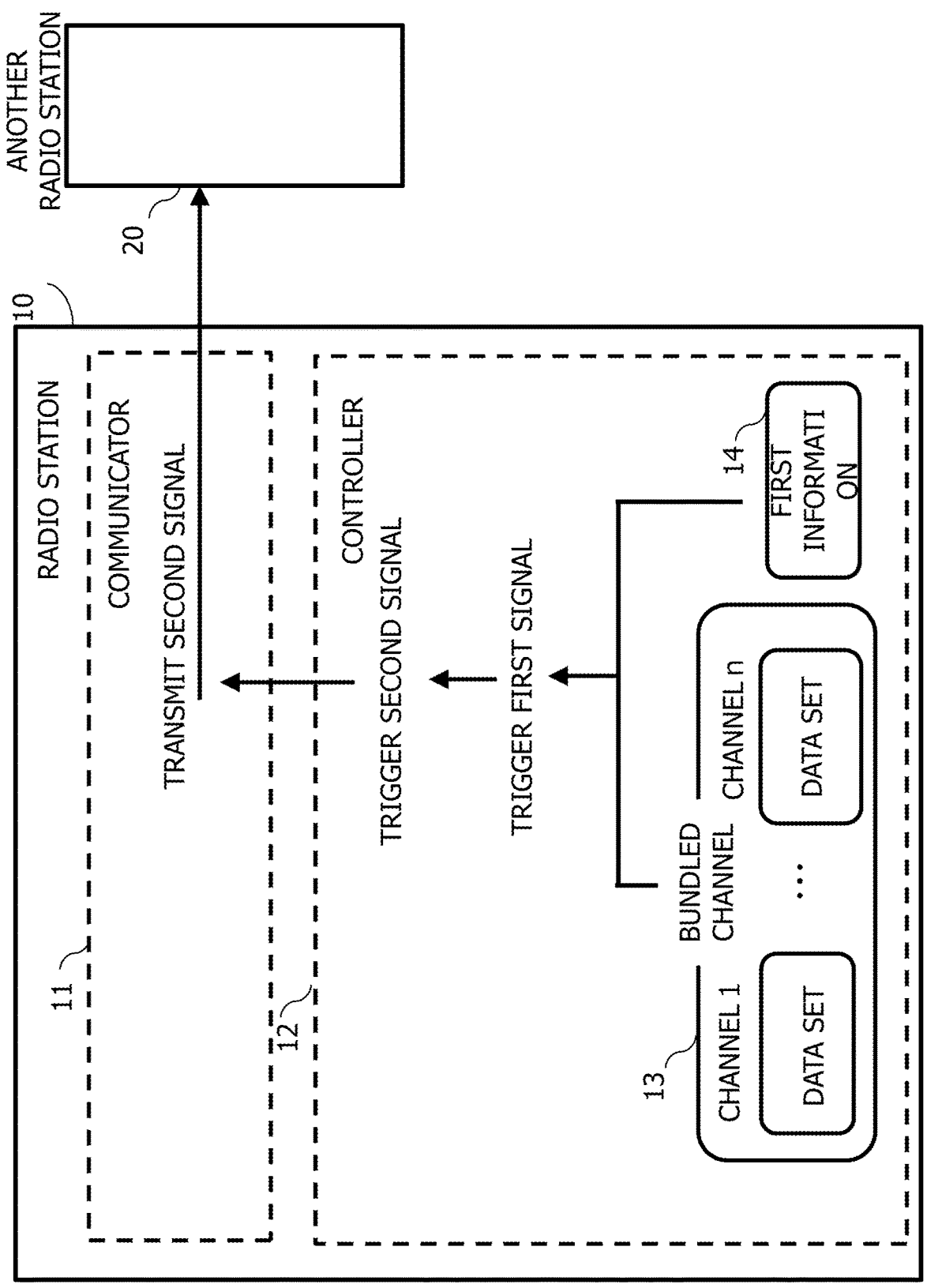
FIG. 1 is a figure illustrating an example of a configuration of a communication system 1.

Referring to the drawings, a detailed description will be given below of the present embodiment. Problems and embodiments in the present description are mere examples, and are not intended to limit the scope of rights of the present application. In particular, even when different described expressions are used, as long as the described expressions are technologically equivalent, the technologies of the present application may be applicable, and the scope of rights is not limited thereby.

First Embodiment

A description will be given of a first embodiment.

FIG. 1 is a figure illustrating an example of a configuration of a communication system 1. The communication system 1 includes a radio station 10 and another radio station 20. The radio station 10 and the other radio station 20 are wirelessly connected to perform communication therebetween. In response to a request from the radio station 10, the other radio station 20 allocates an uplink radio resource.

The radio station 10 has a controller 12 and a communicator 11. The controller 12 and the communicator 11 are built through, e.g., execution of programs by a processor included in the radio station 10. The radio station 10 sets a bundled channel 13 which is a channel group obtained by binding (bundling) a plurality of channels corresponding to individual data sets. Into the bundled channel 13, a plurality of channels which are, e.g., a channel 1 to a channel n (n is an integer) are bundled. The radio station 10 also sets first information, which is information related to the bundled channel 13. Settings related to the bundling, such as setting of the bundled channel and the first information, are made with a control signal transmitted from the other radio station 20 to the radio station 10.

When data to be transmitted to the radio station 20 is generated, the controller 12 performs control such that a transmission opportunity for a first signal is able to be generated (triggered) on the basis of each of an amount of transmission data in the bundled channel (an amount of data accumulated therein) and the first information.

In response to the generation (triggering) of the transmission opportunity for the first signal, the controller 12 generates (triggers) a transmission opportunity for a second signal that requests an uplink resource for the first signal.

The communicator 11 transmits, in response to the generation (triggering) of the transmission opportunity for the second signal, the second signal to the other radio station 20. In addition, the communicator 11 receives a third signal from the other radio station 20 and transmits, in response to the third signal, the transmission data to the other radio station.

Note that, even in the case of "one channel", not the "plurality of channels", the same means is applicable. For instance, a plurality of data sets having different qualities of service (QoS) may be multiplexed into the one channel.

The controller 12 performs categorization of the individual data sets multiplexed into the one channel. The categorization is able to be performed on the basis of, e.g., the QoS. Any header in the data sets is analyzed, classification is performed for each QoS item, and the data sets are categorized into a plurality of QoS classes including the QoS class 1 to the QoS class n (n is an integer). Then, the individual QoS classes are associated with n virtual channels. In addition, a channel group obtained by binding (bundling) the plurality of channels may appropriately be set as the bundled channel 13.

The QoS items are requirement related to communication performance such as, e.g., a data throughput, a delay time, and a loss rate. The communication performance may be end-to-end communication performance, or may also be communication performance of a radio access device. When it is difficult for the data sets to satisfy the communication performance, high QoS is set to allow control that is able to satisfy the communication performance to be performed.

The categorization is not limited thereto. For instance, the categorization may also be performed on the basis of, e.g., types/kinds of the data sets. For instance, the categorization is able to be performed depending on, e.g., whether the data sets are important data sets for communication control or other data sets. Alternatively, the categorization may also be performed on the basis of, e.g., LCG (Logical Channel Group) (see Non-Patent Literature 21).

The controller 12 generates (triggers), in response to the generation (triggering) of the transmission opportunity for the first signal, the transmission opportunity for the second signal that requests the uplink resource for the first signal.

The communicator 11 transmits, in response to the generation (triggering) of the transmission opportunity for the second signal, the second signal to the other radio station device 20. The communicator 11 further receives the third signal from the other radio station and transmits, in response to the third signal, the transmission data to the other radio station.

In the present embodiment, in the allocation of the radio resource, the first signal and the second signal are generated on the basis of the bundled channel, and therefore the effect of reducing signaling increase or power consumption of the terminal device is achieved in contrast to the case of generating the first signal and the second signal on the basis of the individual channels.

Second Embodiment

A description will be given of a second embodiment. Note that, in the following description, the terminal device and a base station device may be referred to also as a radio station and another radio station. For instance, one of the devices may be referred to also as the radio station, while another of the devices may be referred to also as the other radio station.

Figure 2:
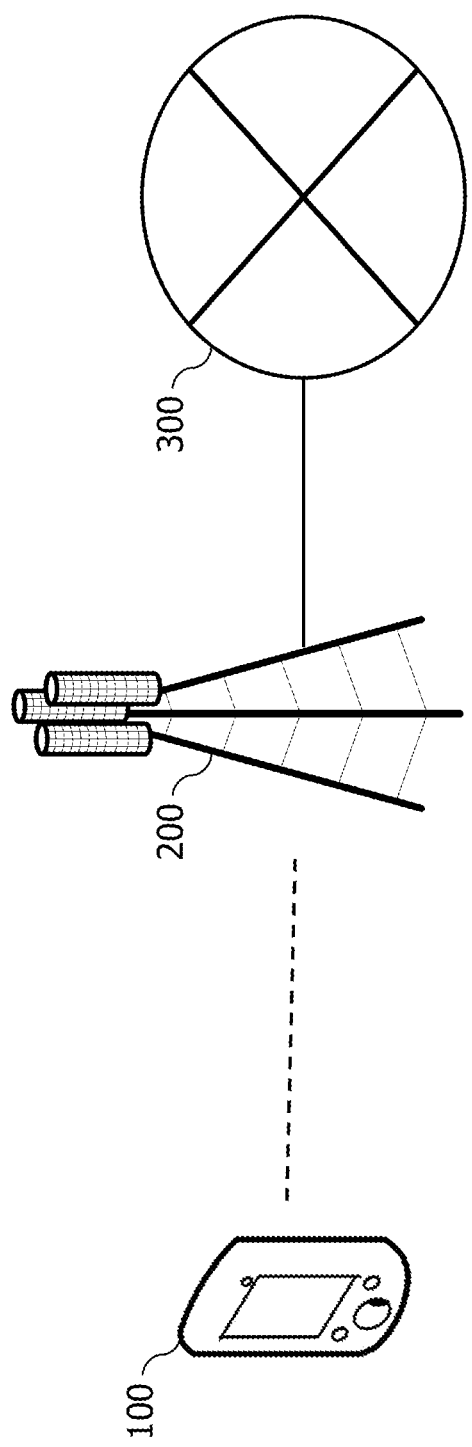
FIG. 2 is a figure illustrating an example of a configuration of a communication system 30.

FIG. 2 is a figure illustrating an example of a configuration of a communication system 30.

The communication system 30 has a terminal device 100, a base station device 200, and a core network 300. The communication system 30 is a system in which the terminal device 100 communicates with another communication device on the core network 300 via the base station device 200.

The terminal device 100 is wirelessly connected to the base station device 200 to perform communication therewith. When a data transmission opportunity is generated, the terminal device 100 requests the base station device 200 to allocate a radio resource.

The base station device 200 is a communication device that relays communication between the terminal device 100 and the other device. The base station device 200 manages radio resources for uplink data for the terminal device 100. The base station device 200 may also manage radio resources for uplink and downlink data.

The core network 300 is, e.g., a network that uses an IP (Internet Protocol) address to perform communication. The core network is, e.g., the Internet or a local network.

In the communication system 30, the terminal device 100 transmits, in a procedure of allocating a radio resource, a scheduling request (SR) to the base station device 200. This procedure is referred to as an SR procedure. When receiving the SR, the base station device 200 transmits, to the terminal device 100, an UL grant (uplink transmission grant) that grants uplink data transmission by the terminal device 100. When receiving the UL grant, the terminal device 100 transmits, e.g., a buffer status report (BSR) including information related to an amount of data to be transmitted. The base station device 200 that has received the BSR allocates, on the basis of the information related to the amount of data to be transmitted, a radio resource for uplink data transmission to the terminal device 100, and transmits the UL grant that reports the allocated radio resource to the terminal device 100. The terminal device 100 transmits the uplink data to the base station device 200 on the basis of the reported radio resource.

In the communication system 30, the terminal device 100 is able to determine, on the basis of an amount of accumulated data in the bundled LCH (Logical Channel), whether or not to transmit the BSR. The bundled LCH includes a plurality of individual LCHs. The amount of the accumulated data indicates, e.g., a data amount of untransmitted data to be transmitted to the base station device 200 (data generated as the data to be transmitted, but is not transmitted yet). Alternatively, the amount of the accumulated data is technologically referred to also as "Data Available Transmission".

<Example of Configuration of Terminal Device 100>

Figure 3:
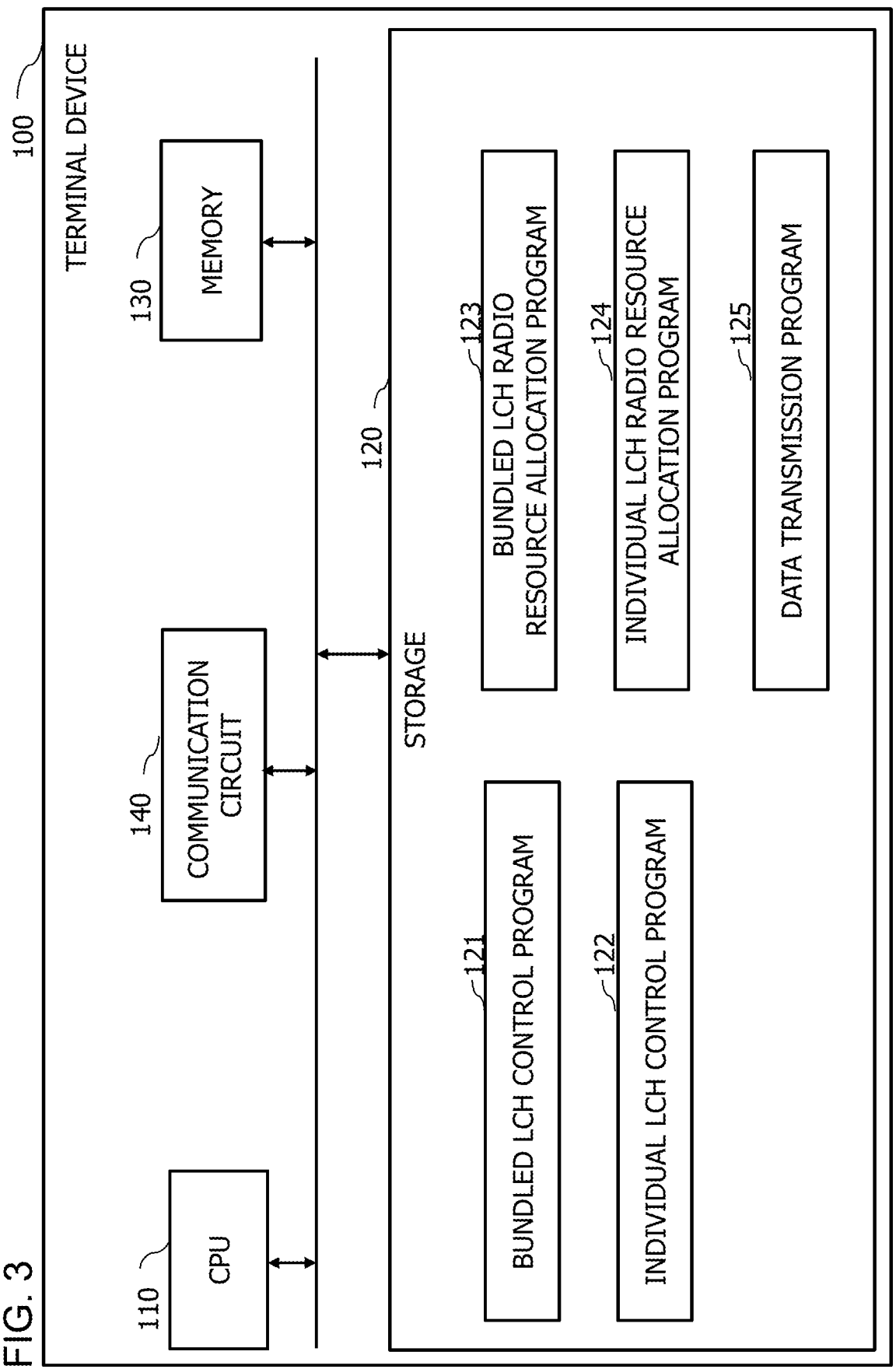
FIG. 3 is a figure illustrating an example of a configuration of the terminal device 100.

FIG. 3 is a figure illustrating an example of a configuration of the terminal device 100. The terminal device 100 has a CPU (Central Processing Unit) 110, a storage 120, a memory 130, and a communication circuit 140.

The storage 120 is an auxiliary storage device that stores programs and data, such as a flash memory, a HDD (Hard Disk Drive), or an SSD (Solid State Drive). The storage 120 stores a bundled LCH control program 121, an individual LCH control program 122, a bundled LCH radio resource allocation program 123, an individual LCH radio resource allocation program 124, and a data transmission program 125.

The memory 130 is a region in which the programs stored in the storage 120 are to be loaded. The memory 130 may also be used as a region in which the programs store data.

The communication circuit 140 is a circuit wirelessly connected to the base station device to perform communication therewith. The communication circuit 140 is, e.g., a network interface card.

The CPU 110 is a processor that loads the programs stored in the storage 120 into the memory 130 and executes the loaded programs to build the individual components or circuits and implement each processing.

The CPU 110 executes the bundled LCH control program to build the controller and the communicator and perform bundled LCH control processing. The bundled LCH control processing is processing of determining whether or not to request allocation of a radio resource for transmitting the BSR (whether or not to perform the SR procedure) on the basis of each of the amount of the accumulated data in the bundled LCH and a bundle threshold (first threshold). At this time, the BSR is triggered to serve as a trigger for performing the SR procedure to which the BSR continues.

The CPU 110 executes the individual LCH control program to build the controller and the communicator and perform individual LCH control processing. The individual LCH control processing is processing of determining whether or not to request allocation of a radio resource for transmitting the BSR on the basis of each of accumulated data in the individual LCHs, the accumulated data in the bundled LCH, an individual threshold, and the bundle threshold.

The CPU 110 executes the bundled LCH radio resource allocation program to build the controller and the communicator and perform bundled LCH radio resource allocation processing. The bundled LCH radio resource allocation processing is processing of transmitting the BSR including information related to the amount of the accumulated data in the bundled LCH.

The CPU 110 executes the individual LCH radio resource allocation program to build the controller and the communicator and perform individual LCH radio resource allocation processing. The individual LCH radio resource allocation processing is processing of transmitting the BSR including information related to the amount of the accumulated data in the individual LCHs.

The CPU 110 executes the data transmission program to build the controller and the communicator and perform data transmission processing. The data transmission processing is processing of using the radio resource allocated from the base station device 200 to transmit data (in the bundled LCH, the individual LCHs, or both thereof). In addition, the data transmission processing includes, e.g., LCP (Logical Channel Prioritization) processing described later, and determines the data to be transmitted.

Configurations of the controller and the communicator is able to be set with a control signal received from the radio base station device 200. For instance, settings related to the control programs and the radio resource allocation programs are made with a control signal transmitted from the other radio station 20 to the radio station 10. On the basis of the settings, the individual and bundled LCHs are configured, and the BSR trigger, the SR procedure, the BSR transmission, and the like are set. Preferably, the control signal is, e.g., a RRC (Radio Resource Control signal), but may also be a MAC signal (MAC CE: MAC Control Element) from a viewpoint of immediacy of the setting.

Note a method of making these settings and messages to be used are applicable in all the embodiments.

<Example of Configuration of Base Station Device 200>

Figure 4:
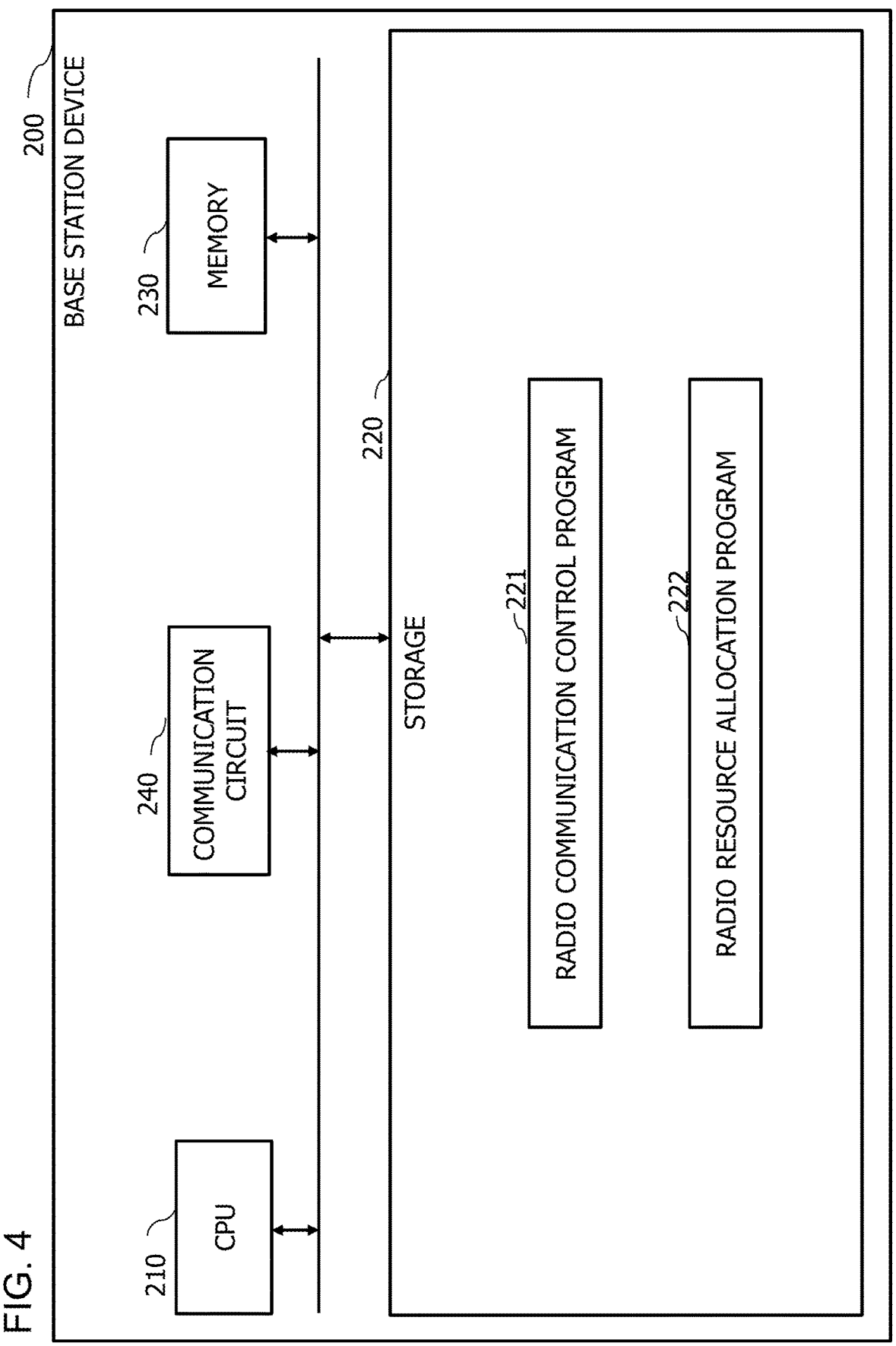
FIG. 4 is a figure illustrating an example of a configuration of the base station device 200.

FIG. 4 is a figure illustrating an example of a configuration of the base station device 200. The base station device 200 has a CPU 210, the storage 220, a memory 230, and a communication circuit 240.

The storage 220 is an auxiliary storage device that stores programs and data, such as a flash memory, a HDD, or an SSD. The storage 220 stores a radio communication control program 221 and a radio resource allocation program 222.

The memory 230 is a region in which the programs stored in the storage 220 are to be loaded. The memory 230 may also be used as a region in which the programs store data.

The communication circuit 240 is a circuit that is connected to each of the terminal device 100 and the core network 300 to perform communication therewith. The communication circuit 240 that communicates with the terminal device 100 and the communication circuit 240 connected to the core network may also include a plurality of different communication circuits. For instance, the communication circuit 240 that communicates with the terminal device 100 may also be a device that supports wireless connection, while the communication circuit 240 that communicates with the core network 300 may also be a device that supports wired connection.

The CPU 210 is a processor that loads the programs stored in the storage 220 into the memory 230 and executes the loaded programs to build the individual components or circuits and implement each processing.

The CPU 210 executes the radio communication control program to build the radio controller and the receiver and perform radio communication control processing. The radio communication control processing is processing of controlling radio communication with the terminal device 100.

The CPU 210 executes the radio resource allocation program to build the radio controller and the receiver and perform radio resource allocation processing. The radio resource allocation processing is processing of transmitting, upon receipt of the SR from the terminal device 100, the UL grant that grants the transmission of the BSR, allocating, upon receipt of the BSR from the terminal device 100, the unlink radio resource on the basis of the information included in the BSR, and transmitting the UL grant including the information related to the allocation to the terminal device 100 to notify the terminal device 100.

<Radio Resource Allocation Processing>

Figure 5:
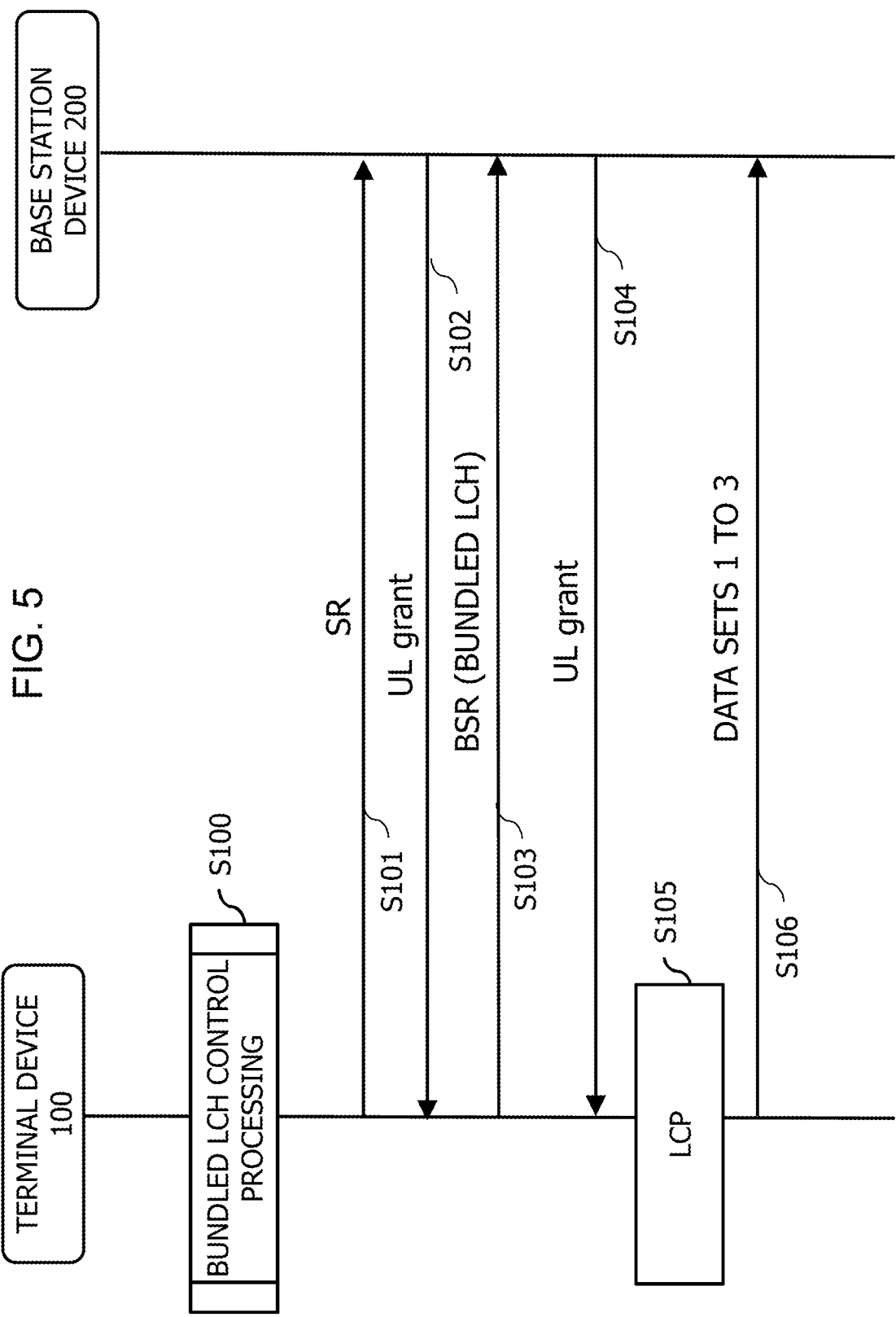
FIG. 5 is a figure illustrating an example of a sequence of the radio resource allocation processing.

FIG. 5 is a figure illustrating an example of a sequence of the radio resource allocation processing. When uplink transmission data is generated, the terminal device 100 performs the bundled LCH control processing (S100). The bundled LCH control processing S100 is processing of comparing a total value of the accumulated data in the target LCH in the bundled LCH to a threshold and triggering, when the threshold is exceeded (when the total value is equal to or more than the threshold), the BSR including the information related to the amount of the accumulated data in the bundled LCH (which may be referred to also as a bundle BSR) to attempt the transmission.

Figure 6:
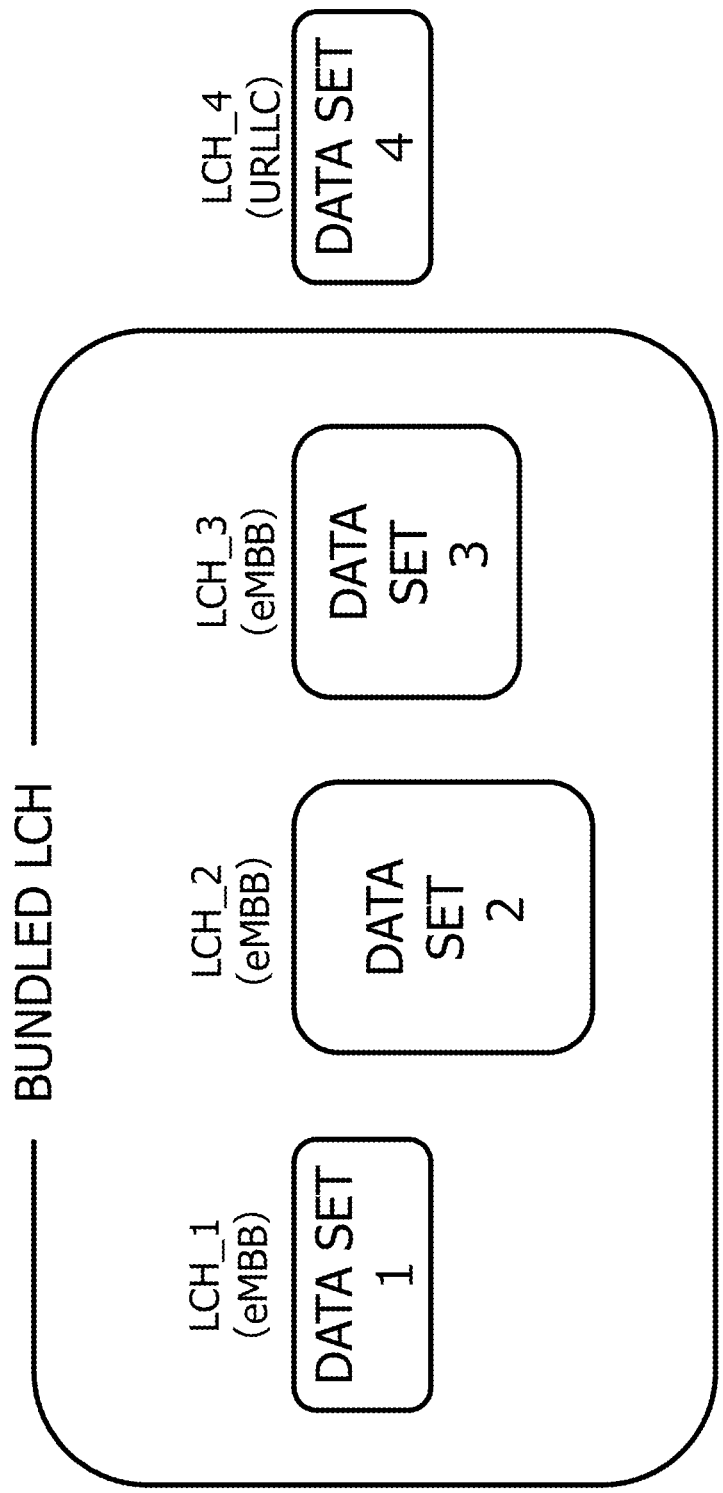
FIG. 6 is a figure illustrating an example of the bundled LCH. For instance, the terminal device 100 has four LCHs, and respective data types to be transmitted are defined.

FIG. 6 is a figure illustrating an example of the bundled LCH. For instance, the terminal device 100 has four LCHs, and respective data types to be transmitted are defined. As illustrated in FIG. 6, each of LCH_1 to 3 is a channel that transmits eMBB data, while LCH_4 is a channel that transmits URLLC data. The terminal device 100 sets, e.g., the LCH_1 to 3 that transmit the same data type as the bundled LCH. Then, the terminal device 100 compares a total value of accumulated data amounts of data sets 1 to 3 to a threshold, and determines whether or not to request the allocation of the radio resource for the data transmission from the bundled LCH.

Note that, e.g., the eMBB data is longer in allowable delay time than the URLLC data. In FIG. 6, the LCHs for the data sets longer in the allowable delay time are set as the bundled LCH and, since the number of times the BSR transmission is performed is able to be reduced by increasing the threshold, it is possible to reduce the number of times the procedure of allocating the radio resources for transmitting the data sets 1 to 3 is performed.

Figure 7:
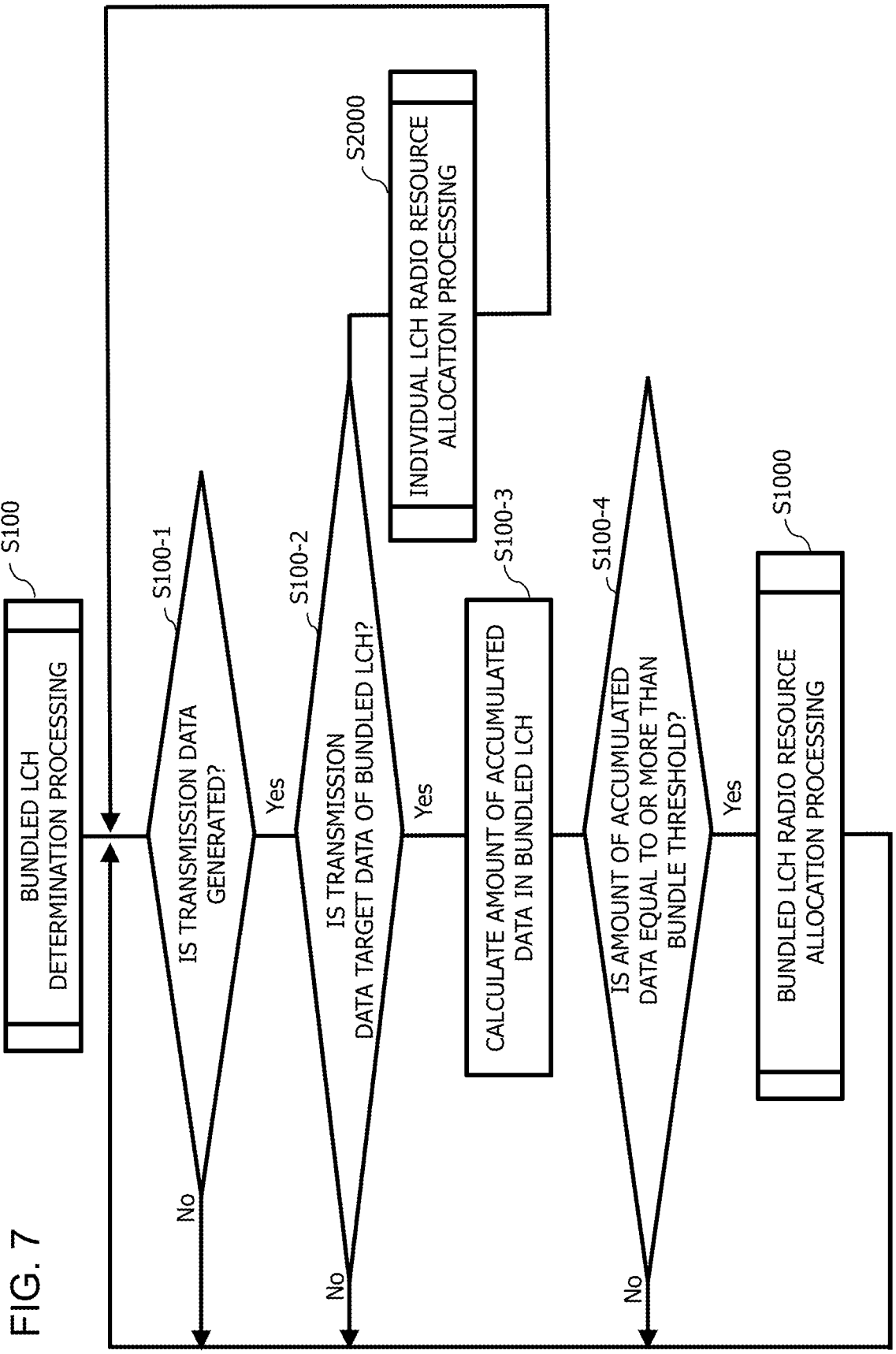
FIG. 7 is a figure illustrating an example of a processing flow chart of the bundled LCH control processing S100.

FIG. 7 is a figure illustrating an example of a processing flow chart of the bundled LCH control processing S100. The terminal device 100 waits for the generation of the transmission data (No in S100-1). When the transmission data is generated (Yes in S100-1), the terminal device 100 checks whether or not the transmission data is target data of the bundled LCH (S100-2).

When the transmission data is not the target data of the bundled LCH (No in S100-2), the terminal device 100 executes the individual LCH radio resource allocation processing (S2000), and waits for again the generation of the transmission data (S100-1).

The individual LCH radio resource allocation processing S2000 is processing of controlling whether or not to request the radio resource for each of the individual LCHs. In the individual LCH radio resource allocation processing S2000, when, e.g., an amount of accumulated data in a given LCH exceeds (or becomes equal to or more than) the individual threshold, the terminal device 100 requests the radio resource for transmitting the data in the LCH. The individual threshold is, e.g., a threshold set for each of the individual LCHs, and may also differ from one LCH to another. Since the "equal to or more than" includes the "exceeding", a description will be given below by using the "equal to or more than".

When the transmission data is the target data of the bundled LCH (Yes in S100-2), the terminal device 100 calculates a total value of the amount of the accumulated data in the bundled LCH (S100-3). Then, the terminal device 100 determines whether or not the amount of the accumulated data is equal to or more than the bundle threshold (S100-4).

When the amount of the accumulated data is not equal to or more than the bundle threshold (No in S100-4), the terminal device 100 waits for again the generation of the transmission data (S100-1).

Meanwhile, when the amount of the accumulated data is equal to or more than the bundle threshold (Yes in S100-4), the terminal device 100 performs the bundled LCH radio resource allocation processing (S1000). The bundled LCH radio resource allocation processing is processing of requesting the radio resource for transmitting the data in the bundled LCH. The bundle threshold is a threshold to be compared to the total value of the accumulated data in the bundled LCH, which is, e.g., a total value of the individual thresholds of the individual LCHs or a value based on the total value. The bundle threshold may also be determined on the basis of the frequency with which data is generated in the bundled LCH, the frequency with which the radio resource allocation procedure is performed, or the like.

Then, the terminal device 100 waits for again the generation of the transmission data (S100-1).

Returning to the sequence in FIG. 5, in the bundled LCH control processing S100, the terminal device 100 determines that the amount of the accumulated data in the bundled LCH (e.g., a total value of the data sets 1 to 3) is equal to or more than the bundle threshold (Yes in S100-4 in FIG. 7). At this time, the BSR is triggered to serve as the trigger for performing the SR procedure to which the BSR continues.

In the bundled LCH radio resource allocation processing S1000, the terminal device 100 transmits the SR to the base station device 200 (S101). The SR is an SR for transmitting the bundled BSR, which is triggered by the BSR trigger. When receiving the SR, the base station device 200 transmits the UL grant that grants the transmission of the uplink data (S102).

When receiving the UL grant (S102), the terminal device 100 transmits the bundled BSR to the base station device 200 (S103). When receiving the BSR (S103), the base station device 200 transmits the UL grant including information related to the radio resource allocated on the basis of the information included in the BSR (S104).

When receiving the UL grant (S104), the terminal device 100 performs LCP processing (S105), generates MAC PDU, and transmits, to the base station device 200, the data sets 1 to 3 accumulated in the bundled LCH by using the allocated radio resource (S106).

Thus, the terminal device 100 in the second embodiment sets the bundled LCH obtained by binding the plurality of individual LCHs, and determines whether or not to request the allocation of the radio resource on the basis of the amount of the accumulated data in the bundled LCH. Thus, the radio resource is requested at timing at which a given amount of data is accumulated, and therefore it is possible to prevent the radio resource allocation procedure from being performed and reduce the power consumption of the terminal device 100 compared to that in a method in which the radio resource is requested for each of the individual LCHs.

The following statement is a statement which is not limited to the present embodiment, and is also applicable to another embodiment. Accordingly, in embodiments including and subsequent to the second embodiment, the statement is omitted unless otherwise specified.

Note that the present and subsequent embodiments are able to be considered to be embodiments obtained by embodying the first embodiment. For instance, the "radio station 10" in the first embodiment corresponds to the terminal device 100, and the "other radio station 20" is able to be associated with the "base station device 200". It is possible to respectively associate the "bundled channel", the "first information", the "control signal", the "first signal", and the "second signal" in the first embodiment with the "bundled LCH", the "first threshold", the "RRC signal or MAC signal", the "SR", and the "BSR".

Note that, even in the case of the "one channel", not the "plurality of channels" also, the same means is applicable. The terminal device 100 performs categorization of each of data sets multiplexed into one channel. The categorization is able to be performed on the basis of the QoS, as described in, e.g., the first embodiment. Any header in the data sets is analyzed, classification is performed for each QoS item, and the data sets are categorized into the plurality of QoS classes including the QoS class 1 to the QoS class n (n is an integer). It may be appropriate to analyze a ToS field in an IP header or a QIF (QoS Flow ID) field or a PFI field (ID of the PC5 QoS flow) in a SDAP header (see Non-Patent Literature 40). Then, the individual QoS classes are associated with n virtual channels. It may be appropriate to further set a channel group obtained by binding (bundling) a plurality of channels as the bundled LCH. Note that the categorization is not limited to separation according to the QoS. The categorization is able to also be performed according to the types/kinds of data sets. The categorization may also be performed according to data sizes or packet sizes. Alternatively, the categorization may also be performed according to an amount of accumulated data (an amount of retained data). In other words, when the same means is applied not to the "plurality of channels", but to the "one channel", as described above, a bundled class in which the plurality of classes categorized in the one channel are bundled may also be handled in a same way as the bundled channel.

This applies not only to the communication between the radio terminal and the base station device, but applies in a same way to V2X. In this case, communication is performed between the terminal and another terminal. In the second embodiment described above, the example of the radio communication between the "terminal device" and the "base station device" has been described, but the second embodiment is also applicable to radio communication between the "terminal device" and the "other terminal device" in the V2X.

Third Embodiment

A description will be given of a third embodiment. The terminal device 100 in the third embodiment uses the bundled LCH to control validity of the individual LCHs or control validity of the BSR.

<Radio Resource Allocation Processing>

Figure 8:
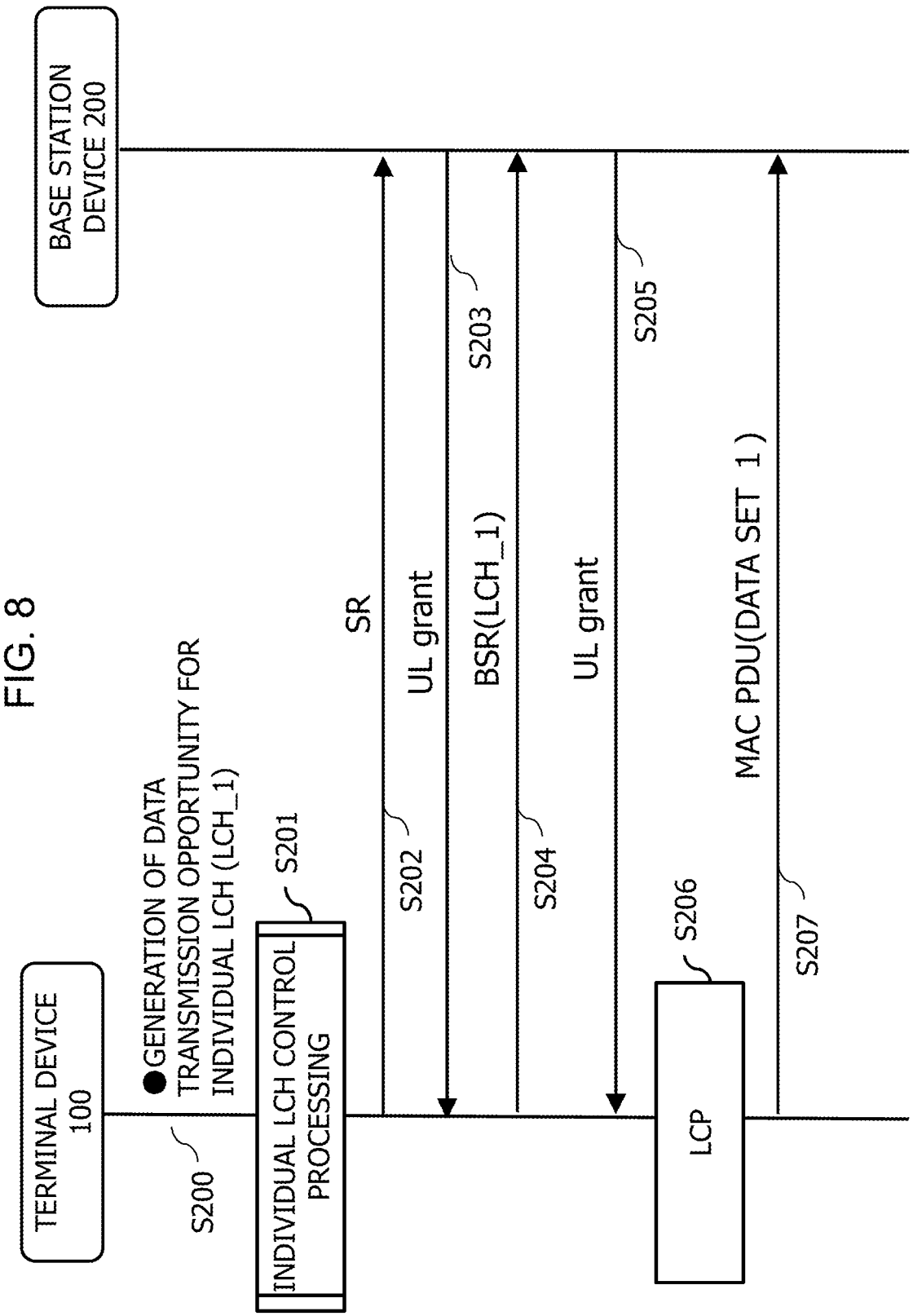
FIG. 8 is a figure illustrating an example of a sequence of the radio resource allocation processing.

FIG. 8 is a figure illustrating an example of a sequence of the radio resource allocation processing. In the terminal device 100, a transmission opportunity for the data in the individual LCH (e.g., LCH_1) is generated (S200). The transmission opportunity for the data in the individual LCH represents a case where, in the individual LCH radio resource allocation processing S2000, an amount of accumulated data in the LCH_1 becomes equal to or more than an individual threshold for the LCH_1.

When a transmission opportunity for the uplink transmission data is generated (S200), the terminal device 100 performs the individual LCH control processing (S201). The individual LCH control processing S201 is processing of comparing the amount of the accumulated data in the individual LCH to a threshold and attempting, when the threshold is exceeded (when the amount of the accumulated data is equal to or more than the threshold), the transmission of the BSR (which may be referred to also as the individual BSR) including the information related to the amount of the accumulated data in the individual LCH. In the processing, the BSR is triggered to serve as a trigger for performing the SR procedure to which the BSR continues.

Figure 9:
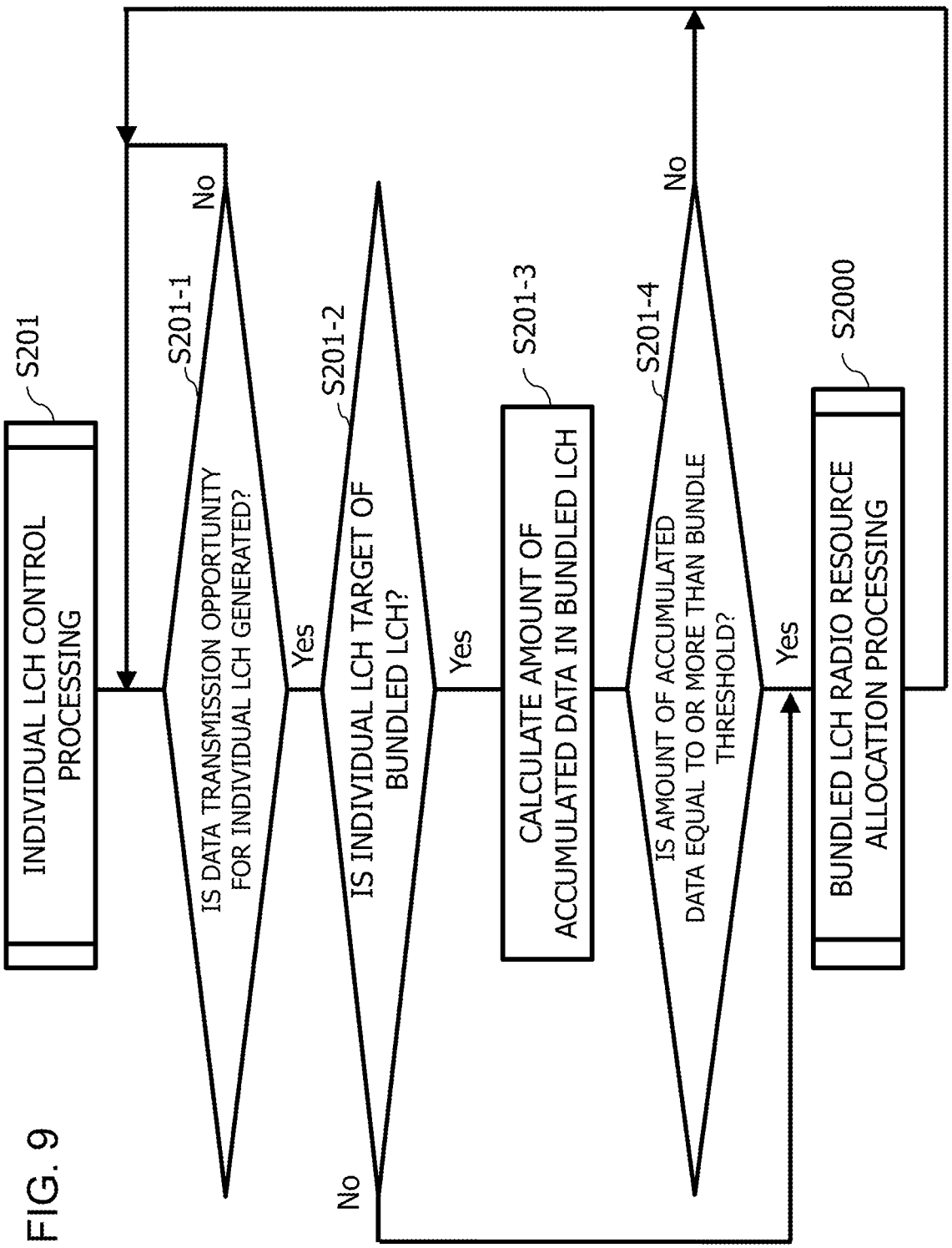
FIG. 9 is a figure illustrating an example of a processing flow chart of the individual LCH control processing S201.

FIG. 9 is a figure illustrating an example of a processing flow chart of the individual LCH control processing S201. The terminal device 100 waits for generation of the data transmission opportunity for the individual LCH (No in S201-1). When the data transmission opportunity for the individual LCH is generated (Yes in S201-1), the terminal device 100 checks whether or not the individual LCH is a target of the bundled LCH (S201-2).

When the individual LCH is not the target of the bundled LCH (No in S201-2), the terminal device 100 performs the individual LCH radio resource allocation processing (S2000), and waits for again the generation of the data transmission opportunity for the individual LCH (S201-1). Note that the individual LCH radio resource allocation processing S2000 may also be the same as the individual LCH radio resource allocation processing S200 in the second embodiment and, since it is determined whether or not the transmission opportunity for the individual LCH has come in the processing S201-1, the processing equivalent to the processing S201-1 may also be omitted.

When the individual LCH is the target of the bundled LCH (Yes in S201-2), the terminal device 100 calculates a total value of the amount of the accumulated data in the bundled LCH (S201-3). Then, the terminal device 100 determines whether or not the amount of the accumulated data is equal to or more than the bundle threshold (S201-4).

When the amount of the accumulated data is not equal to or more than the bundle threshold (No in S201-4), the terminal device 100 waits for again the generation of the data transmission opportunity for the individual LCH (S201-1). At this time, control in which the individual LCH is determined to be invalid is performed.

Meanwhile, when the amount of the accumulated data is equal to or more than the bundle threshold (Yes in S201-4), the terminal device 100 performs the individual LCH radio resource allocation processing (S2000). At this time, control in which the individual LCH is determined to be not valid is performed.

Then, the terminal device 100 waits for again the generation of the data transmission opportunity for the individual LCH (S201-1).

Returning to the sequence in FIG. 8, in the individual LCH control processing S201, the terminal device 100 determines that the amount of the accumulated data in the bundled LCH (e.g., the total value of the data sets 1 to 3) is equal to or more than the bundle threshold (Yes in S201-4 in FIG. 9). At this time, control in which the individual LCH is determined to be valid is performed.

In the individual LCH radio resource allocation processing S2000, the terminal device 100 transmits the SR to the base station device 200 (S202). When receiving the SR, the base station device 200 transmits the UL grant that grants the transmission of the uplink data (S203).

When receiving the UL grant (S203), the terminal device 100 transmits, to the base station device 200, the BSR including the information related to the amount of the accumulated data in the individual LCH (LCH_1) (the amount of the accumulated data set 1) (S204). When receiving the BSR (S204), the base station device 200 transmits the UL grant including information related to the radio resource allocated on the basis of the information included in the BSR (S205).

When receiving the UL grant (S205), the terminal device 100 performs the LCP (S206), generates the MAC PDU, and transmits, to the base station device 200, the data set 1 accumulated in the individual LCH (LCH_1) by using the allocated radio resource (S207).

Thus, the terminal device 100 in the second embodiment uses the amount of the accumulated data in the bundled LCH and the bundle threshold to determine the validity of the individual LCH. The determination of the validity of the individual LCH may be referred to also as determination of validity of the BSR triggered by the LCH.

Note that, when the amount of the accumulated data is not equal to or more than the bundle threshold in the individual LCH control processing S201, the terminal device 100 may also further determine whether the BSR for the individual LCH is valid (activation) or invalid (deactivation) on the basis of information other than the amount of the accumulated data in the bundled LCH (such as, e.g., a use situation of the radio resource or a degree of emergency of the accumulated data), and perform the individual LCH radio resource allocation processing S2000 when the BSR is valid.

The description has been given heretofore of the validity of the individual LCH, but the present embodiment will be described from the viewpoint of the validity of the BSR. When the BSR triggered by the individual LCH is subjected to the validity/invalidity determination (activation/deactivation) of the BSR and determined to be valid, the BSR serves as a trigger for performing the subsequent SR procedure.

When the amount of the accumulated data is not equal to or more than the bundle threshold (No in S201-4), the terminal device 100 determines that the triggered BSR is invalid (deactivated). As a result, the BSR is invalidated, and does not serve as the trigger for performing the subsequent SR procedure. The invalidated trigger is able to be held as a suspended BSR (Pending BSR) by the terminal device 100 until the BSR is validated.

Meanwhile, when the amount of the accumulated data is equal to or more than the bundle threshold (Yes in S201-4), the terminal device 100 determines that the triggered BSR is valid (activated). As a result, the BSR is validated to serve as the trigger for performing the subsequent SR procedure.

In the present embodiment also, it is possible to prevent the radio resource allocation procedure from being performed, and reduce signaling increase or the power consumption of the terminal device 100.

Fourth Embodiment

A description will be given of a fourth embodiment. The terminal device 100 in the fourth embodiment determines, at the generation of the data transmission opportunity for the individual LCH, whether or not to transmit the BSR including the amount of the accumulated data in the bundled LCH.

In other words, the terminal device 100 in the fourth embodiment transmits the BSR including the information related to the amount of the accumulated data in the bundled LCH under the condition that both of the data transmission opportunity based on the amount of the accumulated data in the individual LCH and the data transmission opportunity based on the amount of the accumulated data in the bundled LCH are satisfied.

<Radio Resource Allocation Processing>

Figure 10:
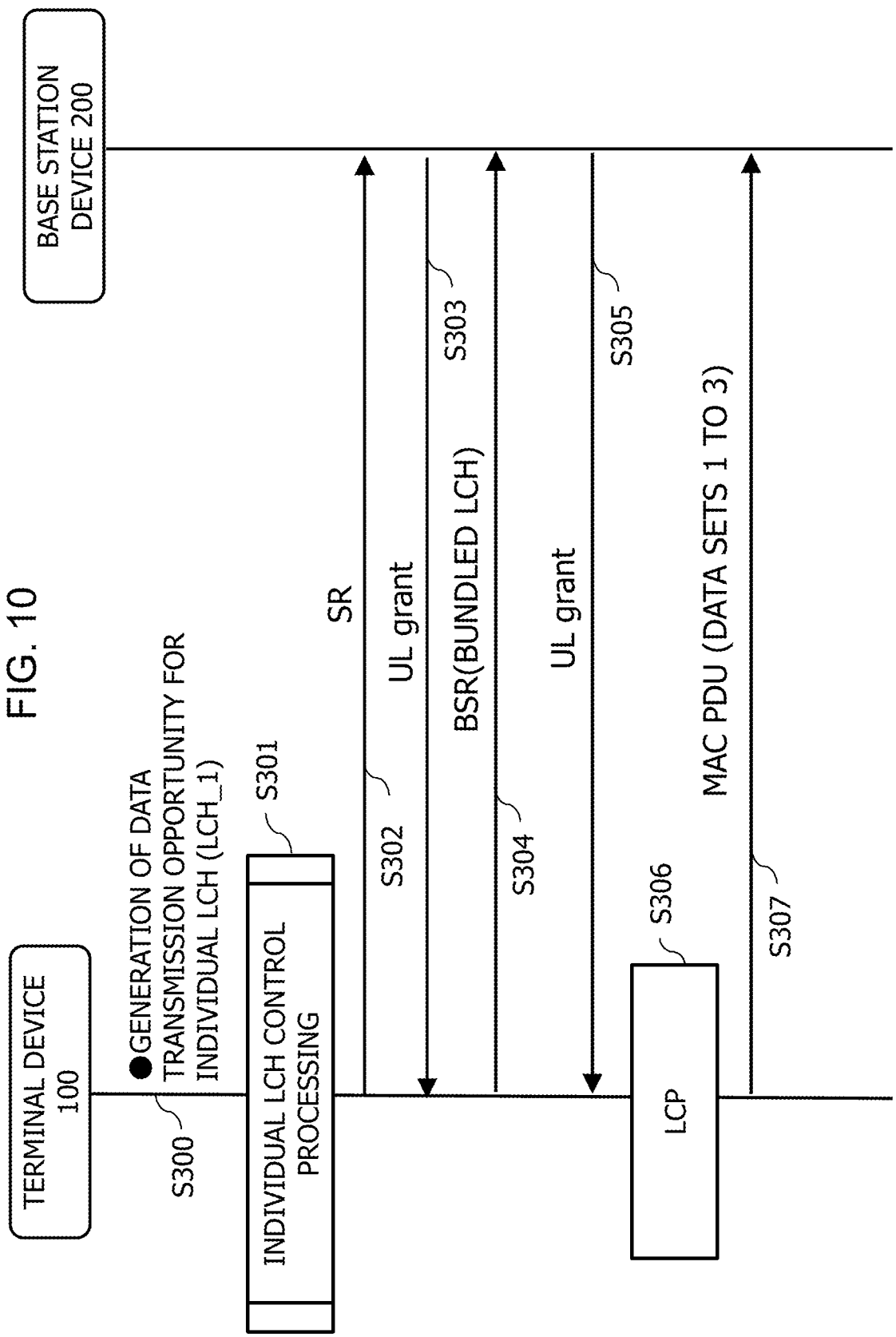
FIG. 10 is a figure illustrating an example of a sequence of the radio resource allocation processing.

FIG. 10 is a figure illustrating an example of a sequence of the radio resource allocation processing. In the terminal device 100, the transmission opportunity for the data in the individual LCH (e.g., LCH_1) is generated (S300).

When the transmission opportunity for the uplink transmission data is generated (S300), the terminal device 100 performs the individual LCH control processing (S301). The individual LCH control processing S301 is processing of comparing the amount of the accumulated data in the individual LCH to a threshold and attempting, when the threshold is exceeded (the amount of the accumulated data is equal to or more than the threshold), the transmission of the BSR including the information related to the amount of the accumulated data in the bundled LCH. In this processing, the BSR is triggered to serve as a trigger for performing the SR procedure to which the BSR continues.

Figure 11:
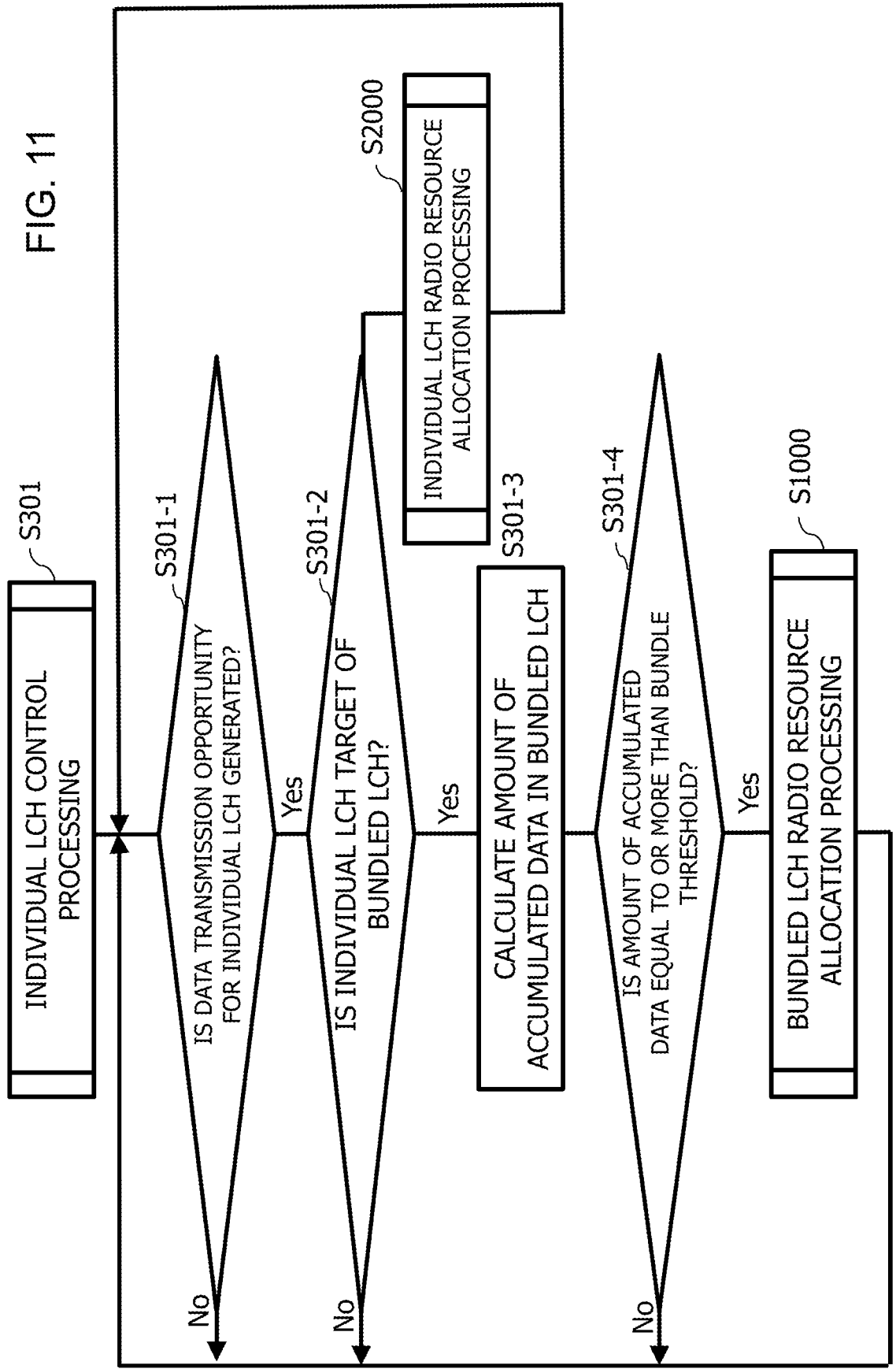
FIG. 11 is a figure illustrating an example of a processing flow chart of the individual LCH control processing S301.

FIG. 11 is a figure illustrating an example of a processing flow chart of the individual LCH control processing S301. The terminal device 100 waits for the generation of the data transmission opportunity for the individual LCH (No in S301-1). When the data transmission opportunity for the individual LCH is generated (Yes in S301-1), the terminal device 100 checks whether or not the individual LCH is the target of the bundled LCH (S301-2).

When the individual LCH is not the target of the bundled LCH (No in S301-2), the terminal device 100 performs the individual LCH radio resource allocation processing (S2000), and waits for again the generation of the data transmission opportunity for the individual LCH (S301-1).

When the individual LCH is the target of the bundled LCH (Yes in S301-2), the terminal device 100 calculates the total value of the amount of the accumulated data in the bundled LCH (S301-3). Then, the terminal device 100 determines whether or not the amount of the accumulated data is equal to or more than the bundle threshold (S301-4).

When the amount of the accumulated data is not equal to or more than the bundle threshold (No in S301-4), the terminal device 100 waits for again the generation of the data transmission opportunity for the individual LCH (S301-1). At this time, in the same manner as in the third embodiment, control of the invalidity determination of the individual LCH or the BSR may also be performed.

Meanwhile, when the amount of the accumulated data is equal to or more than the bundle threshold (Yes in S301-4), the terminal device 100 performs the bundled LCH radio resource allocation processing (S1000). At this time, in the same manner as in the third embodiment, control of the validity determination of the individual LCH or the BSR may also be performed.

Then, the terminal device 100 waits for again the generation of the data transmission opportunity for the individual LCH (S301-1).

Returning to the sequence in FIG. 10, in the individual LCH control processing S301, the terminal device 100 determines that the amount of the accumulated data in the bundled LCH (e.g., the total value of the data sets 1 to 3) is equal to or more than the bundle threshold (Yes in S301-4 in FIG. 11). At that time, in the same manner as in the third embodiment, the control of the validity determination of the individual LCH or the BSR may also be performed.

In the bundled LCH radio resource allocation processing S1000, the terminal device 100 transmits the SR to the base station device 200 (S302). When receiving the SR, the base station device 200 transmits the UL grant that grants the transmission of the uplink data (S303). The subsequent processing S303 to S307 is the same as the processing S102 to S106 in FIG. 5.

When both of the amount of the accumulated data in the individual LCH and the amount of the accumulated data in the bundled LCH satisfy the transmission opportunities (equal to or more than the individual threshold for the individual LCH and equal to or more than the bundle threshold for the bundled LCH), the terminal device 100 in the fourth embodiment transmits the BSR including the information related to the amount of the accumulated data in the bundled LCH. This is able to reduce the number of radio resource allocation requests and reduce the signaling increase or the power consumption of the terminal device 100.

Note that, in, e.g., the "No" paths from the branch processing S301-1 to 4 in FIG. 11, the individual radio resource allocation processing S2000 may also be performed. There are cases where the need to consider the power consumption of the terminal device 100 is low such as, e.g., when electric power to the terminal device 100 is sufficient or when the terminal device 100 is connected to a charger. In this case, when either of the amount of the accumulated data in the individual LCH and the amount of the accumulated data in the bundled LCH becomes equal to or more than the threshold by performing the processing, the radio resource allocation processing is performed, and therefore it becomes possible to perform data transmission having higher immediacy.

Fifth Embodiment

A description will be given of a fifth embodiment. In the first to fourth embodiments described above, when the radio resource allocation processing is performed on the basis of the amount of the accumulated data in the bundled LCH and when data is slowly accumulated in the bundled LCH (when a frequency of generation of data in the bundled LCH is low), a time period before the data is transmitted may be elongated to cause a delay. Accordingly, in the fifth embodiment, a bundled LCH guard timer (timer) is provided and, when the data in the bundled LCH is not transmitted for a predetermined time period or longer, the bundled LCH radio resource allocation processing S1000 is performed.

<Radio Resource Allocation Processing>

Figure 12:
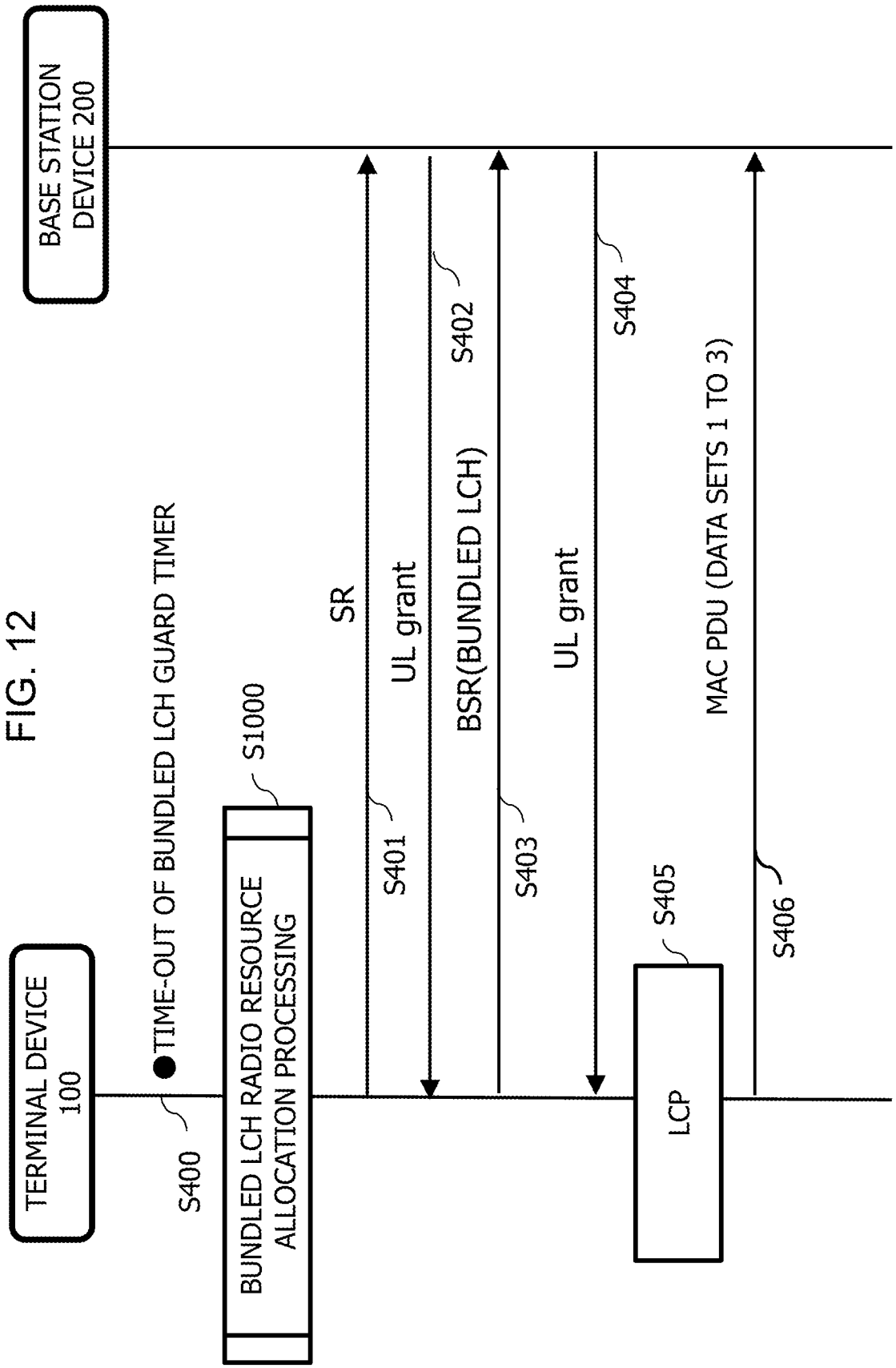
FIG. 12 is a figure illustrating an example of a sequence of radio resource allocation processing at time-out of the bundled LCH guard timer.

FIG. 12 is a figure illustrating an example of a sequence of radio resource allocation processing at time-out of the bundled LCH guard timer. In the terminal device 100, the time-out of the bundled LCH guard timer occurs (S400). When the time-out of the bundled LCH guard timer occurs (S400), the terminal device 100 performs the bundled LCH radio resource allocation processing S1000. The subsequent processing S401 to S406 is the same as the processing S101 to S106 in FIG. 5.

The bundled LCH guard timer (the guard timer) is activated at timing of generation of target data of the bundled LCH in the bundled LCH when, e.g., the amount of the accumulated data in the bundled LCH is 0 (in a state where, after the accumulated data in the bundled LCH was transmitted, the target data of the bundled LCH has not been newly generated). The bundled LCH guard timer is stopped when, e.g., the accumulated data in the bundled LCH is transmitted.

A timer value in the bundled LCH guard timer is set in consideration of an allowable end-to-end delay time such as, e.g., between the terminal devices or between applications. The terminal device 100 sets, as the timer value, such a time period as not to exceed the allowable delay time.

The timer value in the bundled LCH guard timer may also be set on the basis of, e.g., a discard timer (PDCP Discard Timer). The discard timer is a time period during which, e.g., a PDCP layer is allowed to retain the data (time period allowed before transmission). When the time period expires, the corresponding data (PDCP SDU) is discarded. The terminal device 100 sets the timer value in the bundled LCH guard timer such that the timer value in the discard timer is not exceeded. Note that, since the discard timer is set on the basis of importance of data (e.g., whether or not the data is critical data), the allowable delay time, or the like, the terminal device 100 needs to select the timer value in the discard timer to be considered (to be referenced) on the basis of the importance of the data in the bundled LCH, the allowable delay time, or the like. Alternatively, the value in the guard timer is able to also be set with an RRC signal.

Sixth Embodiment

A description will be given of a sixth embodiment. In each of the first to fourth embodiments described above, in the LCP processing, the terminal device 100 uses the radio resource for the individual BSR to transmit the data in the individual LCH, while using the radio resource for the bundled BSR to transmit the data in the bundled LCH. However, the LCP processing is a design matter to be, e.g., implemented using an algorithm determined in advance, and the radio resource specified by the UL grant received by the terminal device 100 from the base station device 200 may possibly be used to transmit data in any LCH. For instance, in the MAC PDU in the sequence in FIG. 5, the UL grant may also be used to transmit a data set 4 other than the data sets 1 to 3. In other words, the UL grant is allocated by using the terminal device 100 as a smallest unit, and is not allocated exclusively for transmitting data in the specified LCH. Alternatively, for instance, in the MAC PDU in the sequence in FIG. 8, the UL grant may also be used to transmit the data sets 2 to 4 other than the data set 1.

The terminal device 100 in the sixth embodiment defines, in the LCP processing, a method of using the allocated radio resource.

Figure 13:
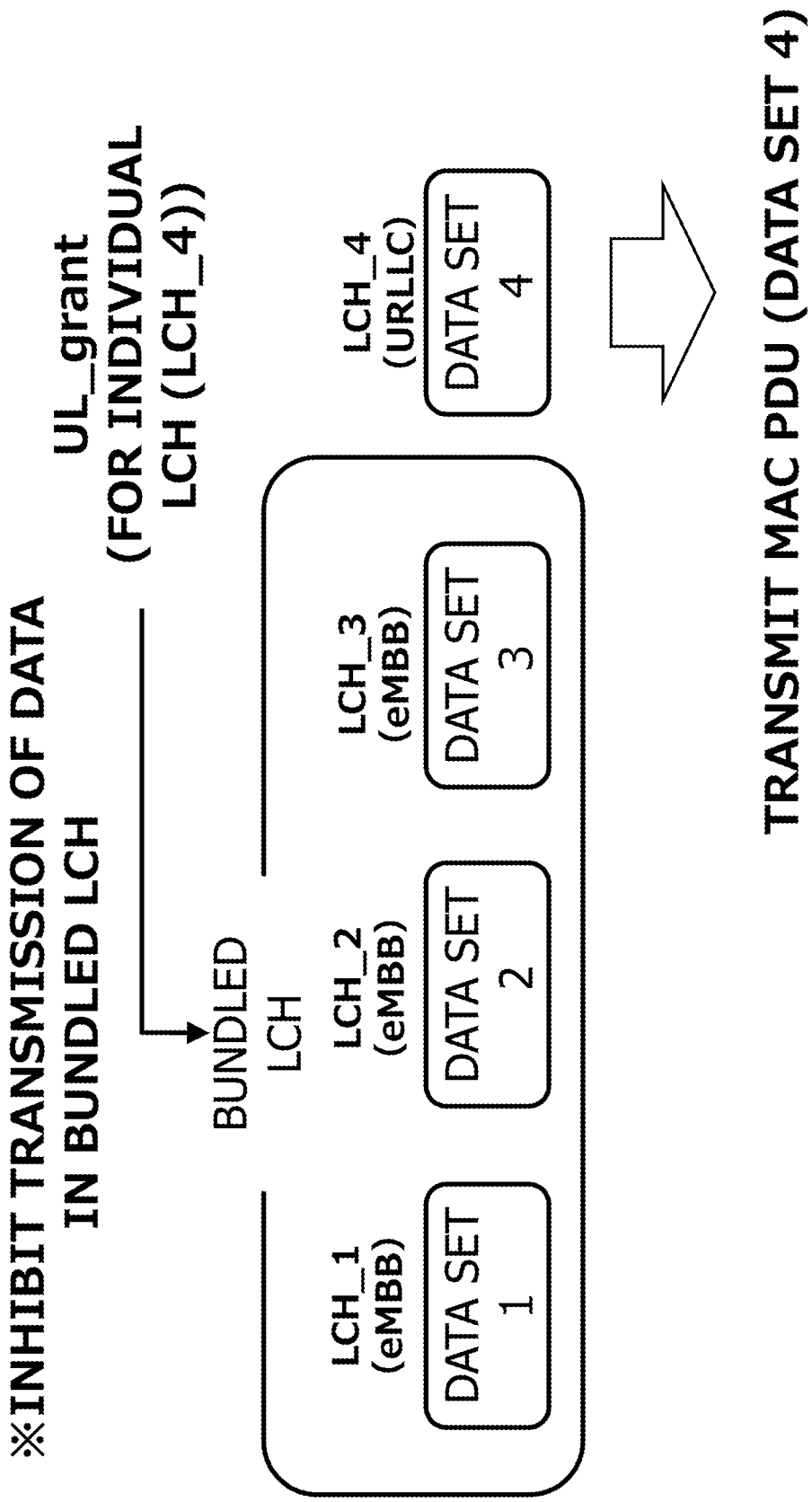
FIG. 13 is a figure illustrating an example of the method of using the radio resource in a case where, as a result of the LCP processing performed by the terminal device 100, the radio resource is allocated to the individual LCH.

FIG. 13 is a figure illustrating an example of the method of using the radio resource in a case where, as a result of the LCP processing performed by the terminal device 100, the radio resource is allocated to the individual LCH. In FIG. 13, the terminal device 100 performs the SR procedure on the BSR for the individual LCH (LCH_4), and receives the UL grant. In the LCP processing, to perform control such that the radio resource is allocated to the individual LCH, the terminal device 100 performs control such that the transmission of the data in the bundled LCH is inhibited (or restricted). For instance, LCH_4 is the LCH for URLLC data, and has an allowable delay time shorter than that in eMBB. Accordingly, transmission from the LCH_4 is preferably performed preferentially to that from the bundled LCH. Therefore, for instance, the terminal device 100 does not use the radio resource allocated to the individual LCH in which data has a higher priority for the data transmission from the bundled LCH to thereby prevent a delay in the transmission of the data having the higher priority. Such control expands, e.g., the LCP processing, and introduces an algorithm that enforces the restriction.

Figure 14:
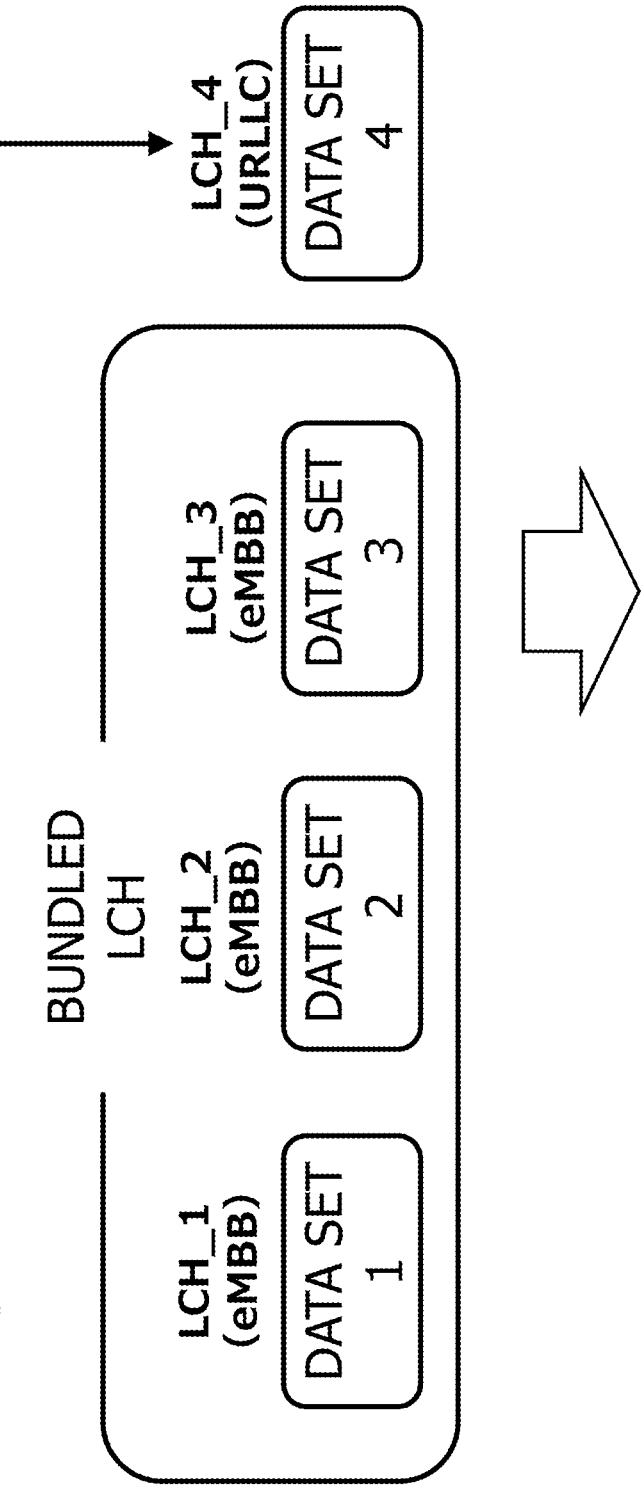
FIG. 14 is a figure illustrating an example of the method of using the radio resource in a case where, as a result of the LCP processing performed by the terminal device 100, the radio resource is allocated to the bundled LCH.

FIG. 14 is a figure illustrating an example of the method of using the radio resource in a case where, as a result of the LCP processing performed by the terminal device 100, the radio resource is allocated to the bundled LCH. In FIG. 14, the terminal device 100 performs the SR procedure on the BSR for the bundled LCH, and receives the UL grant. In the LCP processing, the terminal device 100 performs control such that the radio resource is not allocated to the bundled LCH, and grants the transmission of the data set 4 in the individual LCH (LCH_4). As described above, when there is the data to be transmitted preferentially to the data in the bundled LCH, such as that in the LCH_4, the terminal device 100 grants the transmission of the data in the individual LCH having a higher priority even when the radio resource is allocated to the bundled LCH. This allows the data in the LCH having the higher priority to be transmitted in advance. Such control expands, e.g., the LCP processing, and introduces the algorithm that enforces the restriction.

Note that, in these examples, when the radio resources are left (sufficient) after the allocation of the radio resource to the data in the LCH having the higher priority, the radio resources may also be allocated to the bundled LCH.

OTHER EMBODIMENTS

The individual embodiments may also be combined with each other. The data to be transmitted in the LCP processing or the information included in the BSR in each of the embodiments may also be used for another of the embodiments.

It may also be possible to selectively use the control based on the bundled LCH and the control based on the individual LCH. The terminal device 100 may also determine whether or not to perform the control based on the individual LCH or the control based on the bundled LCH on the basis of, e.g., a radio quality, a frequency of data generation, the allowable delay time, or the like. It may also be possible for the base station device 200 to notify the terminal device 100 which control is to be used.

Thus, the disclosure is able to reduce the signaling increase or power consumption in the allocation of the radio resource.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

REFERENCE SIGNS LIST

1: COMMUNICATION SYSTEM
10: RADIO STATION
11: CONTROLLER
12: COMMUNICATOR
13: BUNDLED CHANNEL
20: ANOTHER RADIO STATION
30: COMMUNICATION SYSTEM

100: TERMINAL DEVICE
110: CPU
120: STORAGE
121: BUNDLED LCH CONTROL PROGRAM
122: INDIVIDUAL LCH CONTROL PROGRAM
123: BUNDLED LCH RADIO RESOURCE ALLOCATION PROGRAM
124: INDIVIDUAL LCH RADIO RESOURCE ALLOCATION PROGRAM
125: DATA TRANSMISSION PROGRAM
130: MEMORY
140: COMMUNICATION CIRCUIT
200: BASE STATION DEVICE
210: CPU
220: STORAGE
221: RADIO COMMUNICATION CONTROL PROGRAM
222: RADIO RESOURCE ALLOCATION PROGRAM
230: MEMORY
240: COMMUNICATION CIRCUIT
300: CORE NETWORK

What is claimed is:

1. A radio station comprising:
a controller configured to:
configure a bundled channel which is a channel group obtained by bundling a plurality of channels and first information related to the bundled channel, and
perform control to generate a transmission opportunity for a second signal that requests an uplink resource for a first signal, according to an amount of data in the bundled channel and the first information; and
a communicator configured to:
transmit the second signal to another radio station according to the transmission opportunity for the second signal, and
receives a radio resource from the another radio station,
wherein the radio resource is allocated to the data in the bundled channel and is not allocated to data in a channel not included in the bundled channel.

2. The radio station according to claim 1, wherein
the communicator is further configured to transmit, when data in a channel that is not included in the bundled channel is generated, a signal for requesting a radio, resource for transmitting the channel.

3. The radio station according to claim 1, wherein
the communicator is further configured to receive an RRC signal as a control signal including third information that is information for a configuration of the bundled channel.

4. The radio station according to claim 1, wherein
the communicator is further configured to receive an RRC signal as a control signal including the first information.

5. The radio station according to claim 1, wherein
the first information includes a first threshold related to the amount of the data in the bundled channel, and
the controller generates a transmission opportunity for the first signal when the amount of the data in the bundled channel is equal to or more than the first threshold.

6. The radio station according to claim 1, wherein
the first signal is a buffer status report (BSR) including information related to an amount of data, and
the second signal is a scheduling request (SR) that requests a uplink radio resource.

7. The radio station according to claim 6,
wherein the first signal includes information related to an amount of data in each of channels including the bundled channel.

8. The radio station according to claim 5,
wherein the controller is further configured to perform the control of the generation of the transmission opportunity for the first signal according to a generation of data in the bundled channel.

9. The radio station according to claim 5, wherein
the first information includes the first threshold,
the first signal includes information related to an amount of data in a first channel configuring the bundled channel, and
the controller is further configured to perform the control of the generation of a transmission opportunity for the first signal on the transmission opportunity for the first signal in the first channel, which is based on the amount of the data in the first channel, and generate the transmission opportunity for the first signal when the amount of the data in the bundled channel is equal to or more than the first threshold.

10. The radio station according to claim 5,
wherein the controller performs the control of a generation of the transmission opportunity for the first signal on the transmission opportunity for the first signal for a first channel configuring the bundled channel, which is according to an amount of data in the first channel.

11. The radio station according to claim 5,
wherein the controller further includes a guard timer,
the controller is further configured to:
activate the guard timer at timing of starting data accumulation in the bundled channel,
stop the guard timer at timing of transmitting the data in the bundled channel, and
generate the transmission opportunity for the first signal at time-out of the guard timer.

12. The radio station according to claim 11,
wherein a timer value in the guard timer is configured according to an allowable delay time for the data in the bundled channel.

13. The radio station according to claim 2,
wherein the communicator is further configured to not use, for transmission of the data in the bundled channel, the radio resource allocated to a channel other than the bundled channel.

14. A radio station comprising:
a communicator configured to receive, from another radio station, a second signal that requests an uplink resource for a first signal and is transmitted according to transmission opportunity for the second signal, the transmission opportunity for the second signal being generated according to an amount of data in a bundled channel which is a channel group obtained by bundling a plurality of channels and first information related to the bundled channel; and
a transmitter configured to transmit a radio resource that is allocated to the another radio station in response to reception of the second signal,
wherein the radio resource is allocated to the data in the bundled channel and is not allocated to data in a channel not included in the bundles channel.

15. A communication system comprising:
a first radio station; and
a second radio station, wherein
the first radio station is further configured to configure a bundled channel which is a channel group obtained by bundling a plurality of channels and first information related to the bundled channel, perform control to generate a transmission opportunity for a second signal that requests an uplink resource for a first signal, according to an amount of data in the bundled channel and the first information, and transmit the second signal to the second radio station according to the transmission opportunity for the second signal, the first radio station is further configured to transmit a radio resource that is allocated to the first radio station in response to reception of the second signal, wherein the uplink resource is allocated to the data in the bundled channel and is not allocated to data in a channel not included in the bundled channel.

* * * * *